Inventor
Lloyd G. Miller
By his Attorney

March 25, 1952 L. G. MILLER 2,590,197
MACHINE FOR APPLYING PRESSURE TO SHOE BOTTOMS
Filed Sept. 1, 1949 9 Sheets-Sheet 3

Inventor
Lloyd G. Miller
By his Attorney

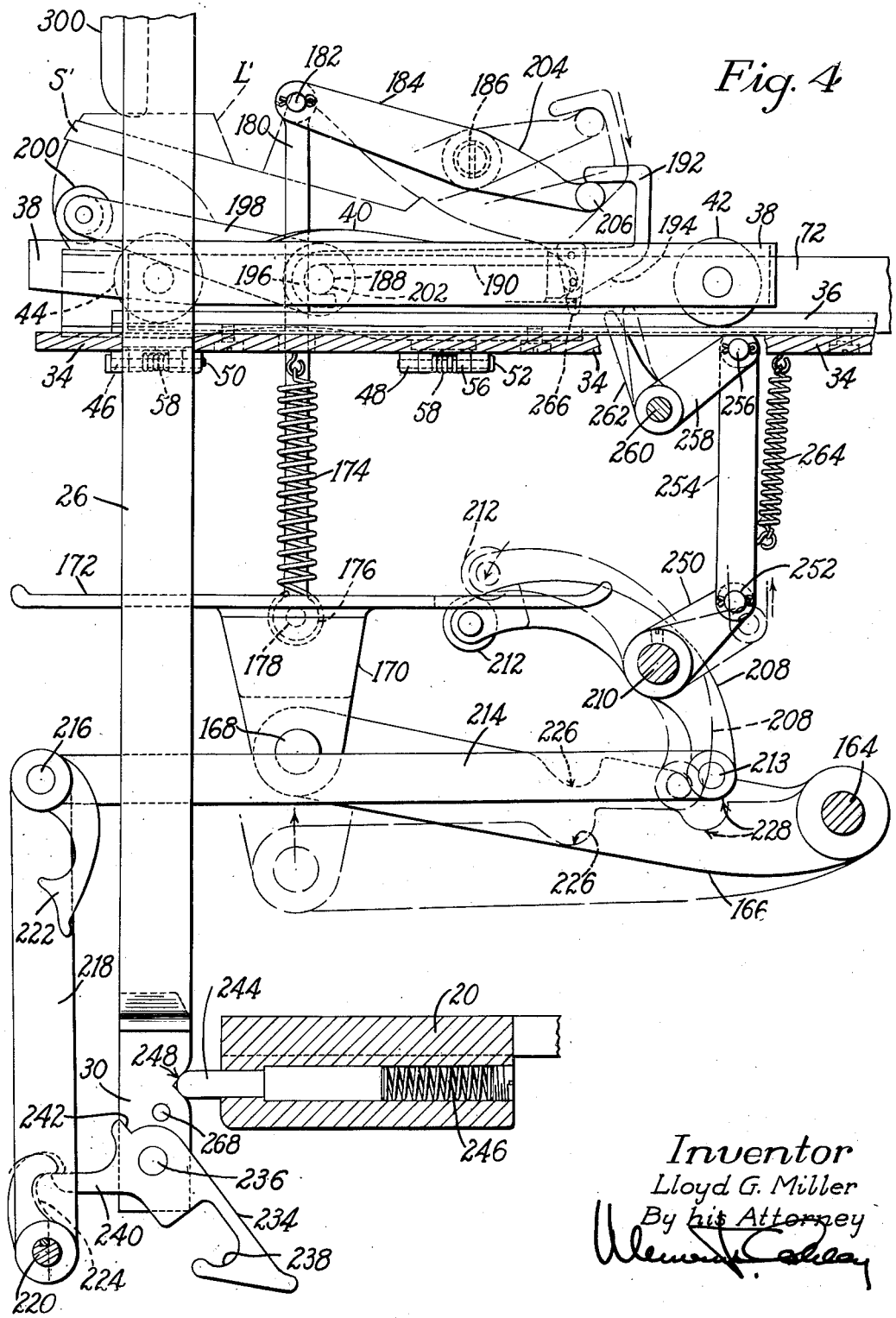

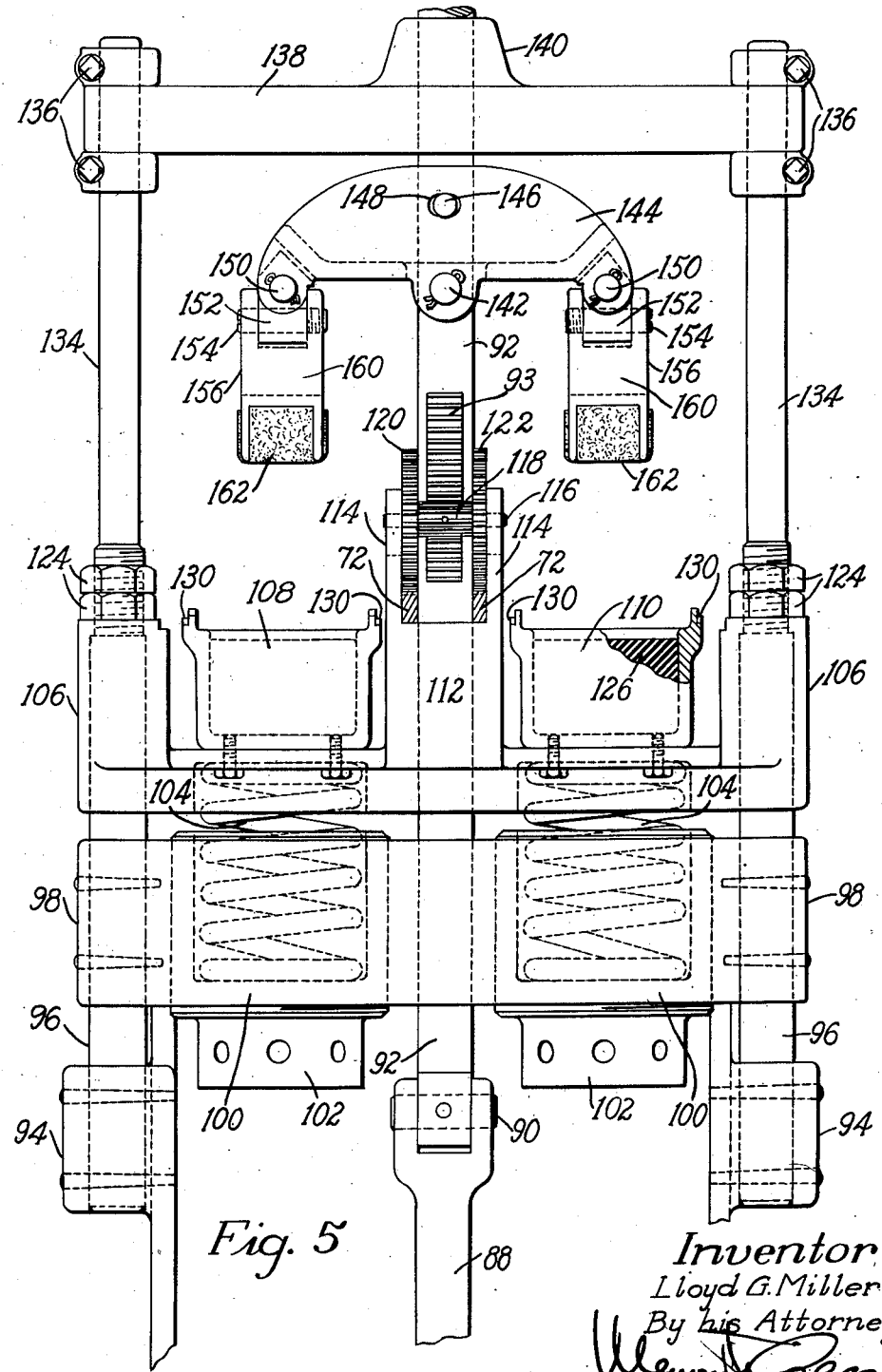

March 25, 1952   L. G. MILLER   2,590,197
MACHINE FOR APPLYING PRESSURE TO SHOE BOTTOMS
Filed Sept. 1, 1949   9 Sheets-Sheet 6
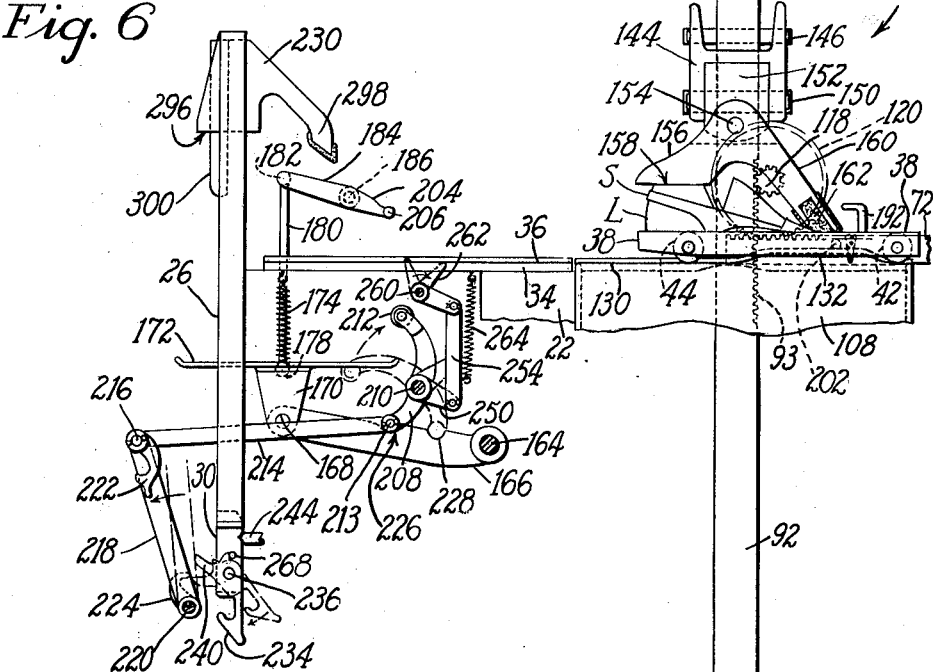
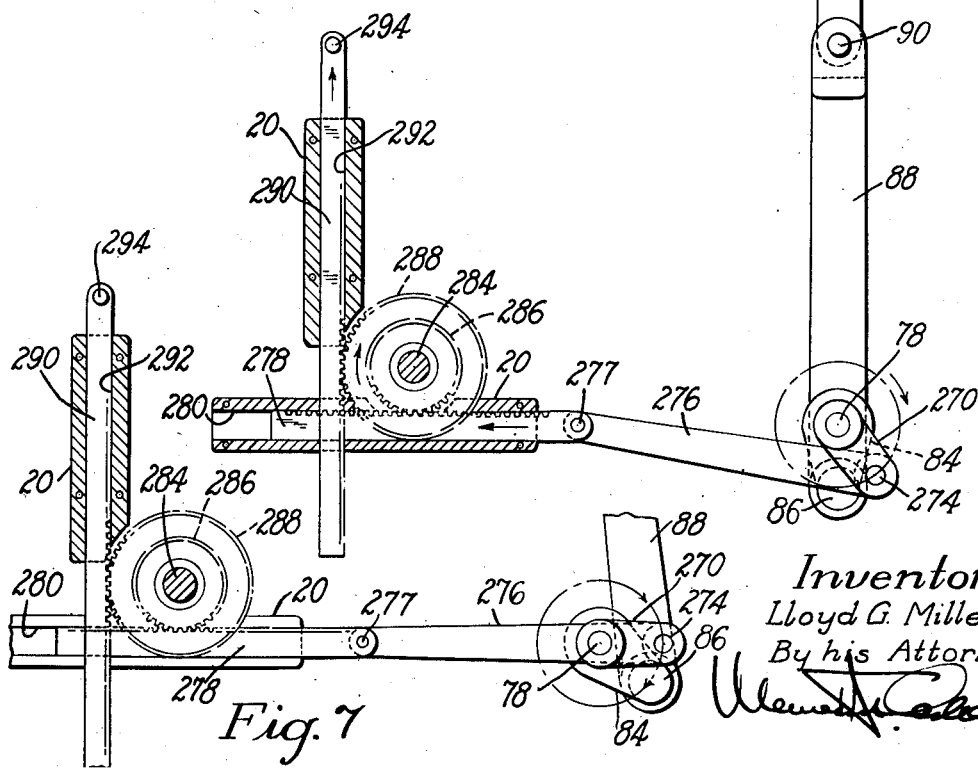
Inventor
Lloyd G. Miller
By his Attorney March 25, 1952 L. G. MILLER 2,590,197
MACHINE FOR APPLYING PRESSURE TO SHOE BOTTOMS
Filed Sept. 1, 1949 9 Sheets-Sheet 7
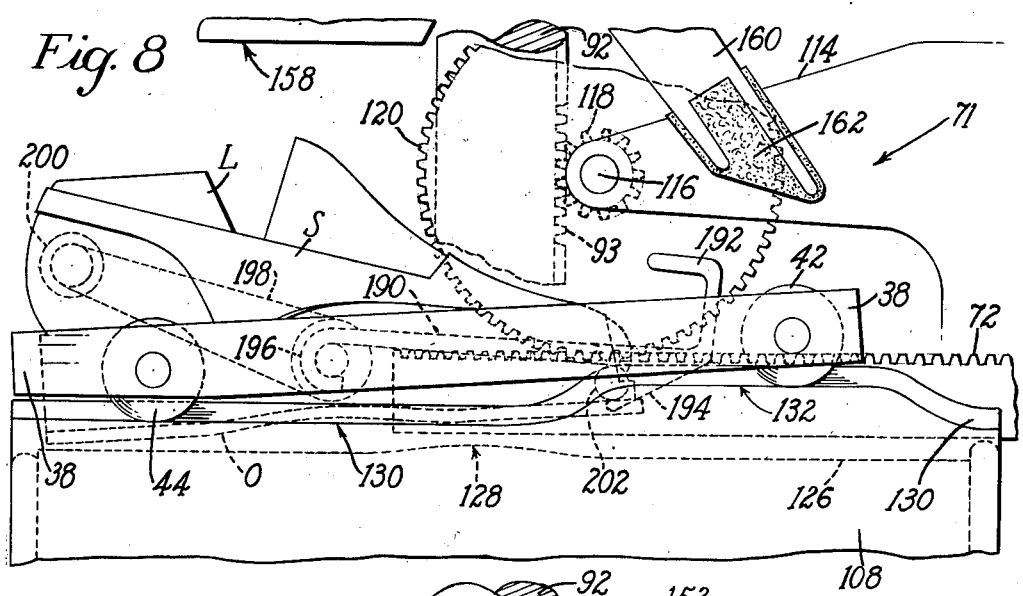
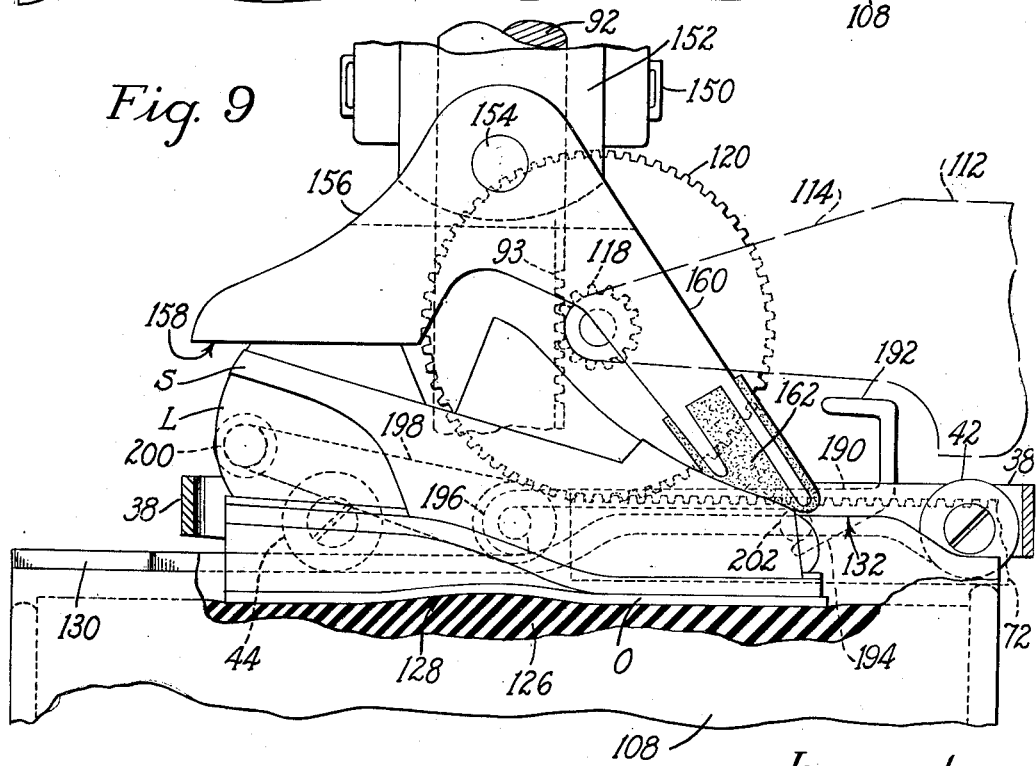
Inventor
Lloyd G. Miller
By his Attorney

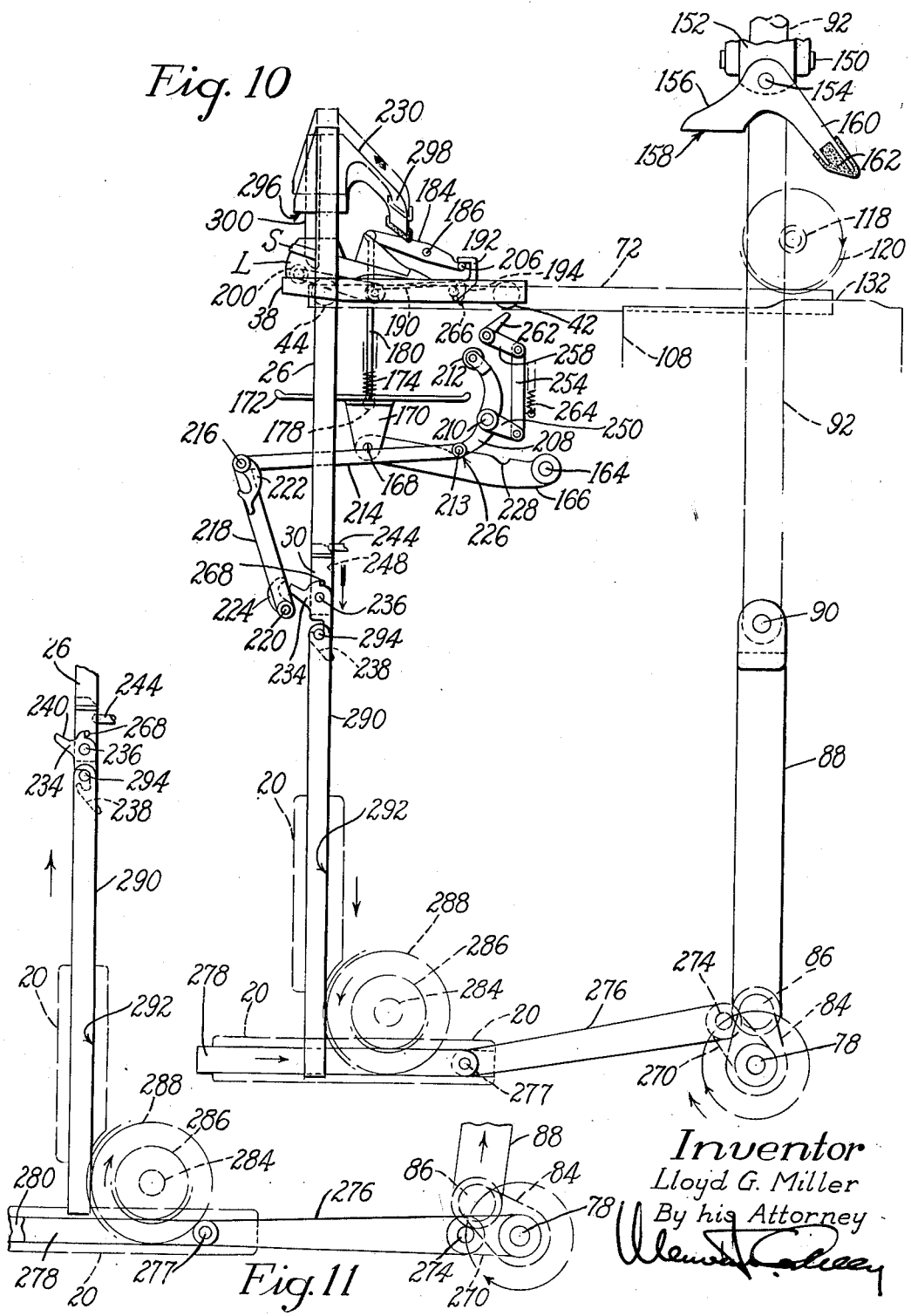

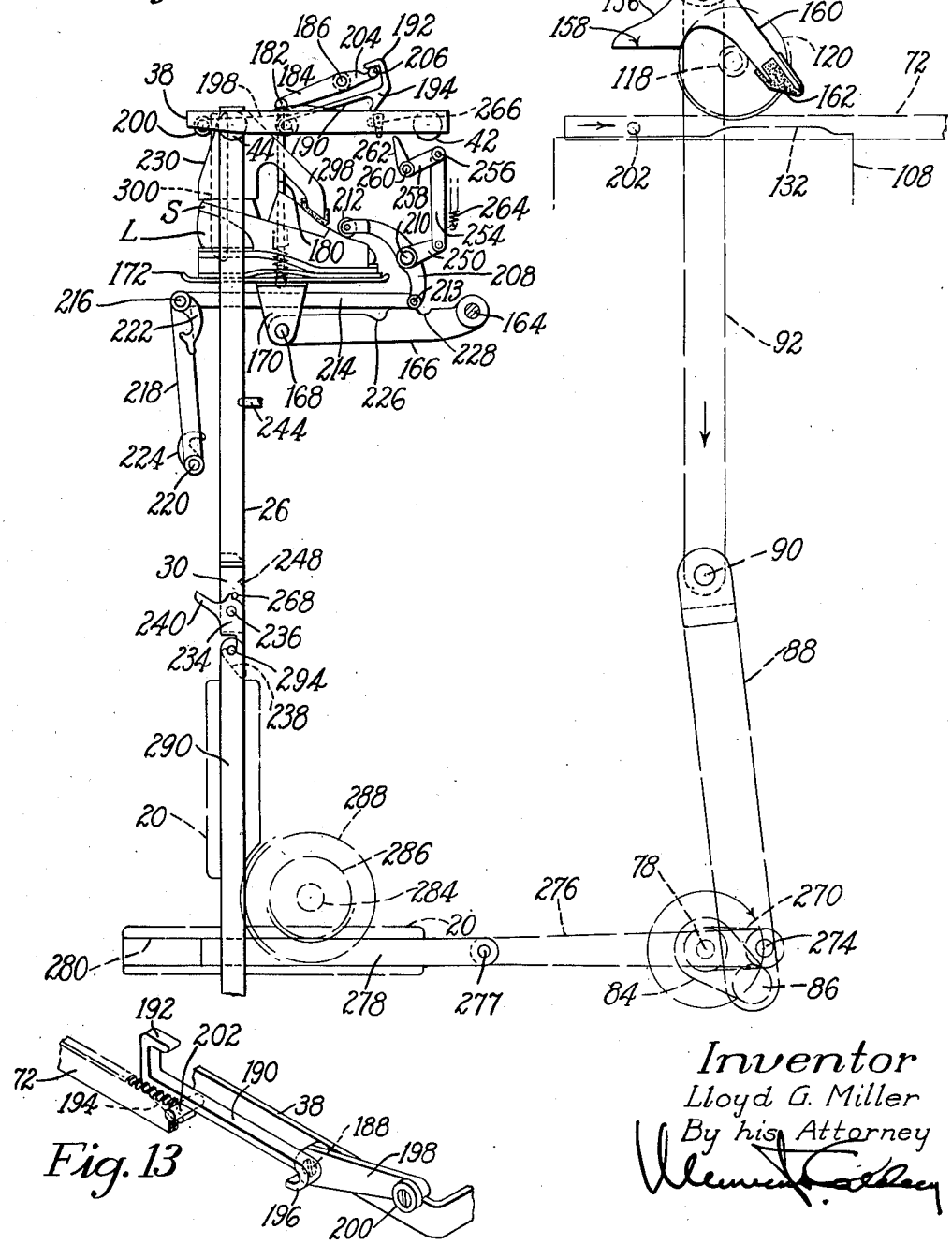

Patented Mar. 25, 1952

2,590,197

UNITED STATES PATENT OFFICE 2,590,197

MACHINE FOR APPLYING PRESSURE TO SHOE BOTTOMS

Lloyd G. Miller, Beverly, Mass., assignor to United Shoe Machinery Corporation, Flemington, N. J., a corporation of New Jersey Application September 1, 1949, Serial No. 113,628

52 Claims. (Cl. 12—36)

This invention relates to machines for performing operations upon shoes and, more particularly, to machines for applying pressure to shoe bottoms to effect sole attaching, sole laying or leveling operations or, if desired, bottom ironing operations.

In the manufacture of some types of cement or compo shoes, it is customary to attach or "spot" the outsoles temporarily to the shoe bottoms a considerable period in advance of the sole attaching operation. Prespotting of the outsoles on the shoe bottoms permits a quick sole attaching operation but it can be done only when a pressure-responsive or "instant pressure" cement is used for attaching the outsoles, that is, a cement which does not require activation by heat or a solvent just before the outsole is attached and which sticks permanently upon the application of pressure alone. One type of shoe in which the outsoles are usually prespotted is the slip-lasted platform shoe, the outsoles in these shoes being attached by a pressure-responsive cement which requires no activation so that the outsoles become permanently bonded to the shoe bottoms by the application of relatively heavy pressure alone for a brief period of time, for example, a second or a fraction of a second.

A machine for attaching an outsole to this type of shoe should be considerably faster in operation than the usual types of cement sole attaching machines in use today. Moreover, such a machine should be arranged to apply relatively heavy pressure for the short period of time that pressure is required. In order to maintain production as high as possible in this class of work, that is, to keep up with the other operations upon the shoe, the machine should preferably be arranged to handle two shoes at a time, for example, it should be able to operate upon a pair of shoes simultaneously during each operating cycle of the machine. It should also be flexible enough to be capable of operating upon one shoe at a time, if desired, in order to handle shoes in which the sole attaching cement requires activation before the outsole can be attached and in which, therefore, the outsoles cannot be prespotted on the shoe bottoms long in advance of the sole attaching operation. Preferably, such a machine should be automatic because of the speed at which it should operate and also because of the close timing that would be necessary between the moving parts. Furthermore, in the case of some sole pressing operations, for example, bottom ironing operations, an automatic machine would provide a predetermined time dwell for the shoe and thus prevent the burning of the shoe by the heated ironing devices or units utilized in such operation.

One object of the present invention is to provide an improved machine for applying pressure to shoe bottoms which will be relatively simple and economical in construction and easy to operate. Another object of the invention is to provide an improved pressure applying machine that will be capable of performing the operations mentioned above and able to handle the types of shoes referred to. A still further object is to provide an automatic machine for applying pressure to shoe bottoms which is adapted to operate upon a pair of shoes simultaneously but which will also be capable of operating upon one shoe at a time, for example, if an outsole to be attached to a shoe is not prespotted upon the shoe bottom.

To the attainment of these objects the invention provides, in accordance with one of its features, an improved machine for operating upon shoes having means thereon for performing an operation upon a shoe, and means controlled by the removal of a processed shoe from the machine for initiating the operation of the machine. The operating means, as herein illustrated, comprises a pressure applying member located at an operating or work station for applying pressure to the bottom of a shoe, and a continuously operating presser foot for pressing the shoe against said member. The machine is also provided with a shoe-receiving or loading station and a shoe delivery or unloading station in addition to the work station. Means is provided for moving the shoe automatically away from the shoe-receiving station into the operating or work station and, after a short dwell thereat, for moving the shoe away from the operating station back again into the shoe-receiving station, from which point the processed shoe is automatically transferred by further means into the shoe delivery or unloading station.

The illustrated means for initiating the operation of the machine by the removal of a processed shoe from the machine comprises a support at the delivery station for receiving the processed shoe, a sensing member cooperating with said support, and mechanism located between the support and the shoe moving means for automatically connecting said shoe moving means to continuously operating power-operated means by the removal of the processed shoe from said support, thereby initiating a new cycle of operation of the machine upon a new shoe which was introduced into the shoe-receiving station before the processed shoe was removed from the delivery station.

As herein illustrated, the connecting mechanism preferably comprises a hooked member associated with the shoe moving means and normally maintained in an inoperative position so that the moving means is not connected to the continuously operating power-operated means. The hooked member is moved into an operative position, however, automatically by the removal of a processed shoe from the support, thereby permitting the hooked member to engage the power-operated means and connect the shoe moving means to said means to initiate a new cycle of operation of the machine upon the next shoe.

As herein illustrated, the improved machine is adapted to operate either upon a pair of shoes simultaneously or upon one shoe at a time, as desired. The machine is provided with two stations or units for operating respectively upon right and left shoes. The operation of each of these stations, as indicated above, may be effected automatically by the removal of a processed shoe therefrom, thereby initiating a new cycle of operation at that station. If a pair of processed shoes should not be removed at exactly the same time from the delivery or unloading stations of both units of the machine, there is nevertheless sufficient lost motion in the mechanisms of the machine to permit both units to be actuated simultaneously even though there is a short interval between the removal of one shoe and the removal of the other shoe. If the interval should be too great, however, the shoe first removed will initiate the operation of the station from which it was removed, and the opposite station will remain idle during the cycle of operation of that station but will operate upon its own shoe automatically upon the next return of the continuously operating means, whereas the first station will remain inoperative during this later cycle of the second station. It will be seen from the foregoing that the two stations can be operated simultaneously or one at a time and the machine can therefore operate simultaneously upon a pair of shoes or separately upon one shoe. The arrangement is such, moreover, that either one of the two units or stations can be caused to remain in an inoperative position and the other station can then be operated separately, thereby permitting the machine to be used for operating successively upon one shoe at a time in case, for example, the machine is used for attaching soles to shoe bottoms and the sole attaching cement requires activation so that the soles cannot be prespotted long in advance of the sole attaching operation.

The present machine is adapted to operate upon conventional types of shoes as well as upon shoes of the slip-lasted type. Moreover, it is adapted to perform not only a sole attaching operation but also sole laying, leveling and other sole pressing operations. It is arranged, for example, to perform a shoe bottom ironing operation merely by the substitution of bottom ironing devices or units for the pressure-applying members, these devices being heated in accordance with the usual practice in performing this operation.

The above and other features of the invention, including means for automatically disconnecting the continuously operating power-operated means from the operating instrumentalities of the machine at the close of each cycle to prevent the repeated operation of the machine, together with other novel details of construction and combinations of parts, will now be described in detail in connection with the accompanying drawings and thereafter pointed out in the claims.

In the drawings,

Fig. 4 is an enlarged side elevation, partly in section, of the shoe-receiving station and the shoe delivery or unloading station of the right-hand unit of the machine, the view indicating different positions of the mechanism;

Fig. 5 is an elevational view of the pressure-applying mechanism of the machine as seen from the rear;

Fig. 6 is a skeletonized side elevational view, similar to Fig. 2, after the machine has operated through a part of its cycle;

Fig. 7 illustrates the crank mechanism of Fig. 6 in a different operated position;

Fig. 8 is an enlarged side elevation of a shoe entering the operating station of the machine;

Fig. 9 shows the shoe under pressure at the operating station;

Fig. 10 is a skeletonized view, similar to Fig. 6, at the point in the cycle of operation of the machine where the shoe has been returned from the operating station into the shoe-receiving station;

Fig. 11 shows the crank mechanism of Fig. 10 at a still different point in the cycle of operation;

Fig. 12 illustrates the position of operating mechanisms at the shoe-receiving, operating and delivery stations at the end of a complete cycle of the machine; and Fig. 13 is a perspective view of hook mechanism for connecting a shoe receptacle to means for moving the receptacle.

Figure 1:
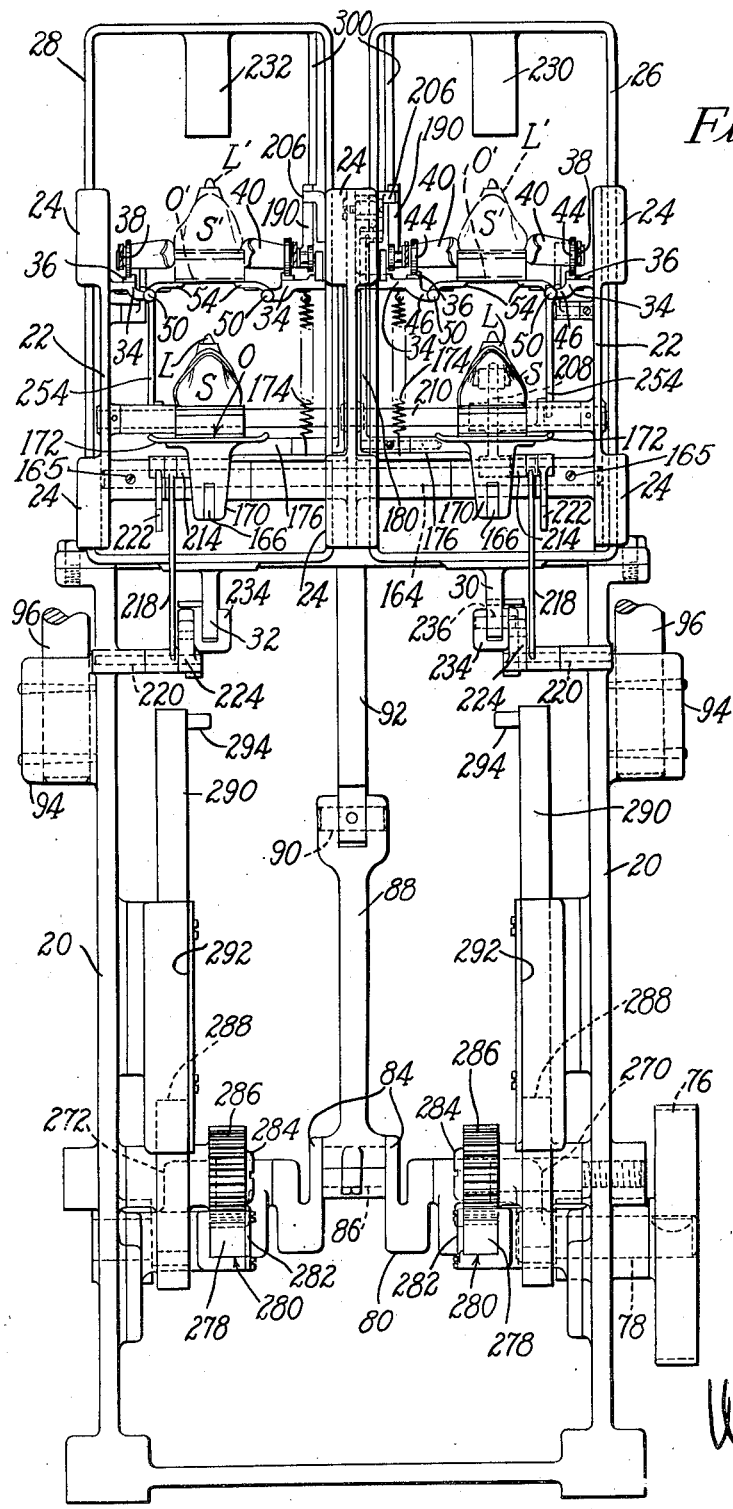
Fig. 1 is a front elevation of the machine embodying the present invention with the rear portion of the machine omitted.

The illustrated machine is a duplex machine adapted to operate upon right and left shoes. It comprises a base or frame 20 having a bracket 22 secured by screws to its upper end, the bracket being provided at its front side with six vertical bosses 24. Mounted for heightwise reciprocating movement in the bosses 24 are a pair of parallel yoke members 26 and 28 which, as illustrated in Fig. 1, comprise substantially rectagular frames provided respectively at their lower ends with downwardly projecting ribs 30 and 32 by means of which the yokes are reciprocated heightwise in the bracket 22. The right-hand yoke 26 is adapted to receive and operate upon a right shoe and the left-hand yoke 28 upon a left shoe. Since both stations of the machine are substantially the same in construction except that they operate upon right and left shoes, only the right-hand station need be described in detail herein, it being understood that the corresponding mechanisms in the left-hand station are similar in construction and operation.

Figure 2:
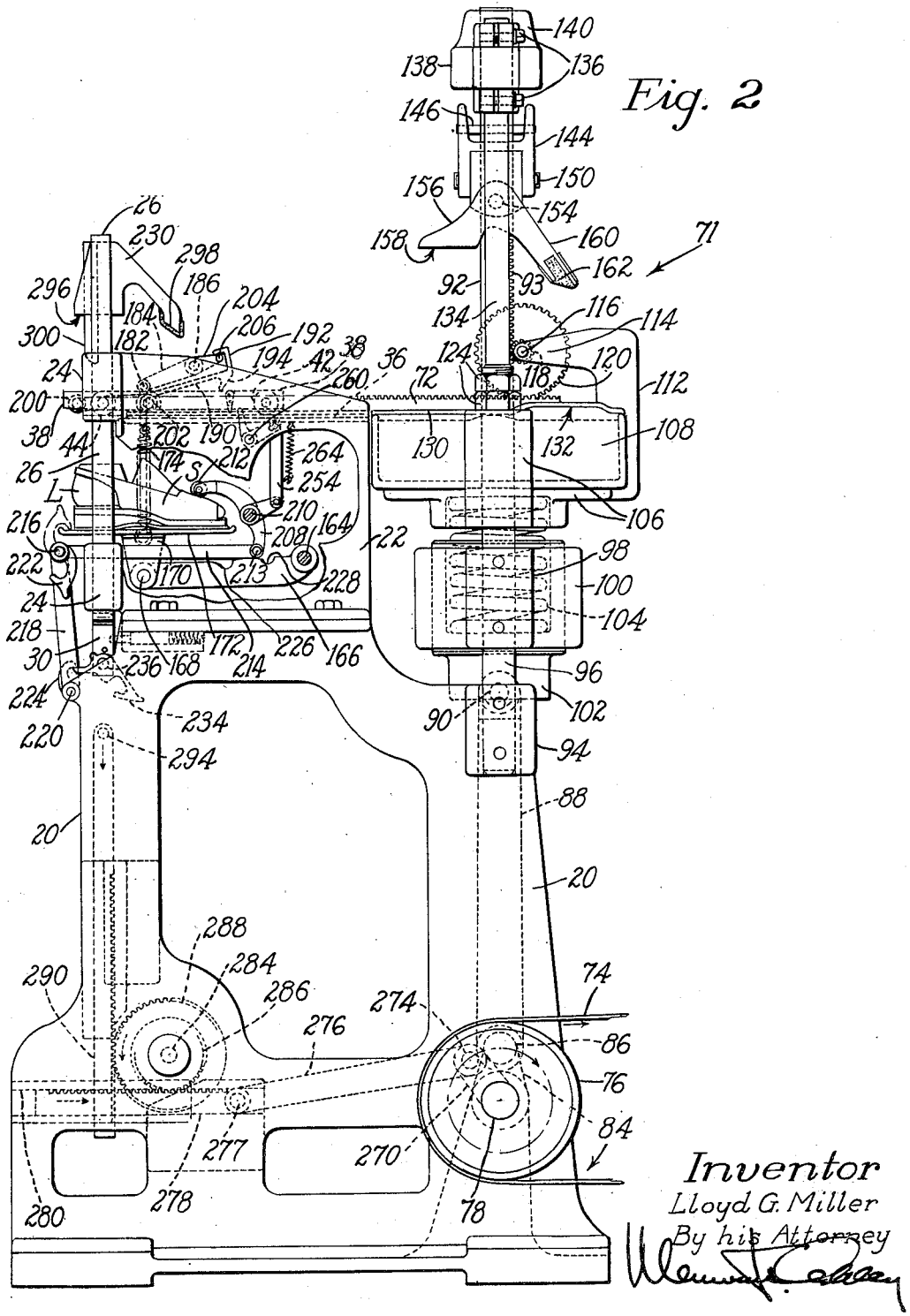
Fig. 2 is a side elevation of the machine on a reduced scale as viewed from the right in Fig. 1 with parts broken away to show details.
Figure 3:
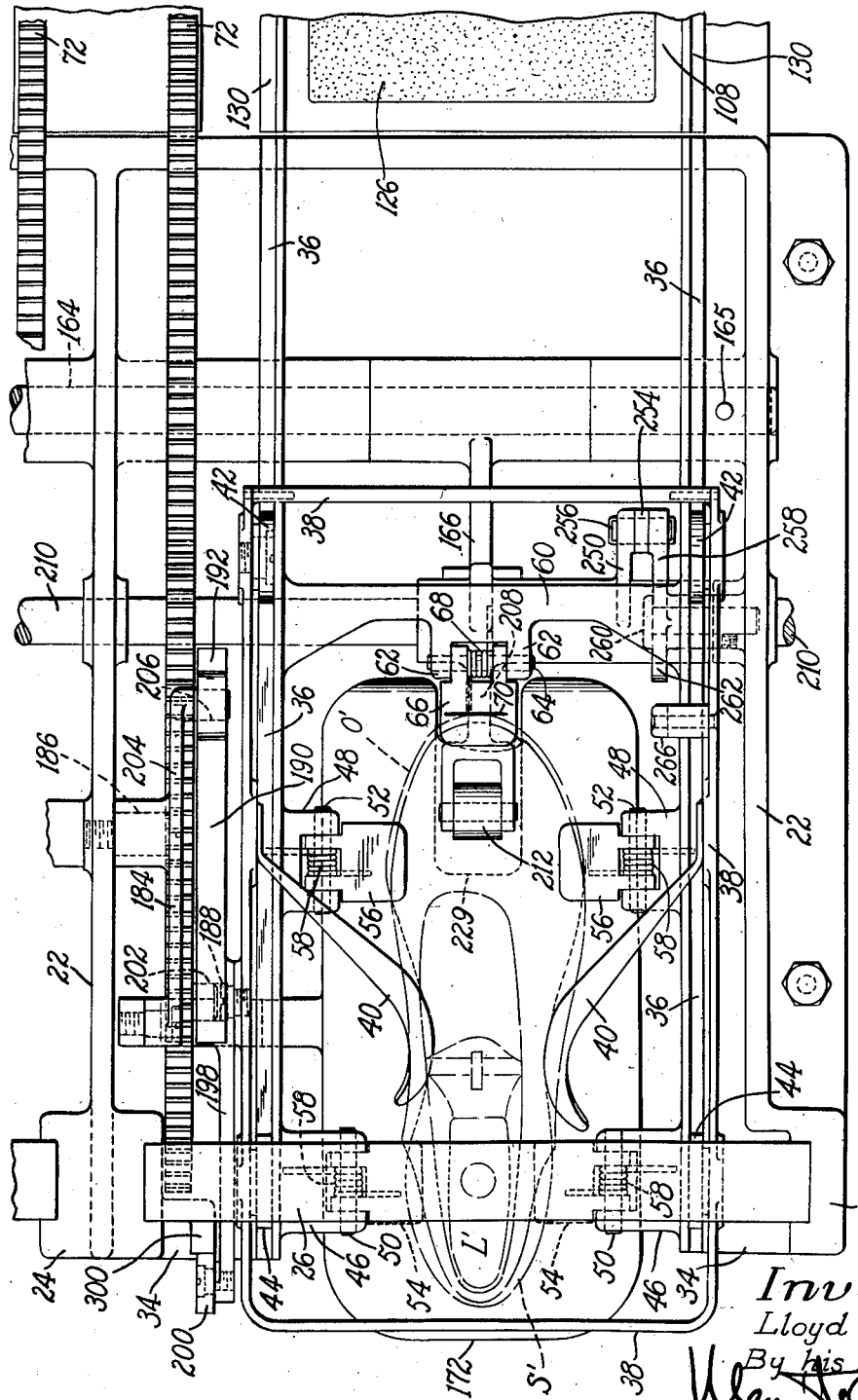
Fig. 3 is an enlarged plan view of the right-hand shoe-receiving or loading station.

The yoke 26 of the right-hand unit of the machine surrounds a shoe-receiving or loading station and a shoe delivery or unloading station, the unloading station, as illustrated in Figs. 1 and 2, being located directly below the receiving station. The shoe-receiving station comprises inwardly extending flanges 34 integral with the upper bosses 24 on the bracket 22 and having formed on their upper sides a pair of horizontal tracks 36 which extend in a straight horizontal path from the front to the rear of the bracket 22, as illustrated in Fig. 3. Mounted for rearward and forward reciprocating movement in the tracks 36 is a substantially rectangular frame 38 which is adapted to receive a shoe to be operated upon by the machine and, as will be presently explained, is arranged to move the shoe from the shoe-receiving station into an operating or work station and, after a short dwell thereat, to move the shoe from the operating station back again into the shoe-receiving station where the shoe is then automatically transferred from said station into the unloading or delivery station. The rectangular frame 38 is open at the top and bottom so that the shoe may be readily mounted therein and depressed downwardly therethrough. Since it is arranged to grip and hold the shoe during the above movements, it will be hereinafter referred to as a "shoe receptacle." The shoe receptacle 38 is provided about midway of its length with inwardly extending leaf springs or clips 40 (Fig. 3) the forward ends of which flare outwardly so that a shoe may be conveniently inserted between them, the springs engaging the shoe substantially at its shank portion and exerting sufficient pressure thereon to hold the shoe firmly in position in the receptacle 38. As shown in Figs. 3 and 4, the shoe receptacle is provided inside its opposite side walls with a pair of rearward rolls 42 and a pair of forward rolls 44 which ride on the opposite tracks 36, thereby permitting the receptacle to be reciprocated forwardly and rearwardly of the machine.

In order to position the shoe heightwise in the receptacle 38 between the spring clips 40, the opposite flanges 34 on the bracket 22 are provided with opposite sets of inwardly extending ears 46 and 48 which carry respectively pins 50 and 52 upon which are pivoted forward plates 54 and rear plates 56, these plates being normally held substantially horizontal by torsion springs 58 (Figs. 3 and 4) which force the plates upwardly against stops provided on the ears 46 and 48. The bracket 22 is also provided with a cross piece 60, positioned rearwardly of the receptacle 38 when the latter is located in the shoe-receiving station, and this cross piece has forwardly extending ears 62 thereon between which is pivoted on a pin 64 another plate 66 which is likewise maintained horizontal by a torsion spring 68, the plate 66 being preferably adjustable lengthwise of the receptacle 38 and having a line 70 extending transversely thereof to indicate the lengthwise position of the toe end of a shoe placed in the receptacle. In this way, the shoe may be positioned heightwise in the receptacle 38 between the spring clips 40 and it may also be positioned lengthwise or longitudinally relatively to the receptacle. The plates 54, 56 and 66 are arranged to yield downwardly about their respective pivots when a shoe is pressed downwardly thereon, thereby permitting the shoe to be forced downwardly through the receptacle 38, when necessary during the operation of the machine, as will be later explained. As illustrated in Figs. 1, 3 and 4, a shoe S' mounted with an outsole O' on a last L', has been introduced into the receptacle 38 and positioned heightwise and longitudinally therein by the pivoted plates 54, 56 and 66, the shoe being held firmly in the receptacle by the spring clips 40.

The present machine is adapted to apply pressure to shoe bottoms to perform sole attaching operations or, if desired, to effect sole laying or sole leveling operations. It is also adapted with a proper pressing member, such as a heated unit or device, to perform a bottom ironing operation upon the bottoms of lasted shoes as well as other pressing operations upon shoe bottoms. For example, it can perform a so-called platform pressing operation in which pressure is applied to the platform sole of a platform shoe after the platform cover has been lasted over the platform sole, this operation insuring that the platform sole is pressed tightly against the seam of the shoe at all points around the periphery thereof and also secured tightly to all portions of the sock lining. While the machine is capable of operating upon all types of shoes, it is particularly adapted for operating upon cement or compo shoes of the slip- or force-lasted type in which the shoe upper is stitched, off a last, to a flexible insole or sock lining and to a platform cover or wrapper strip. A last is then forced into the upper to slip-last the shoe, a platform sole is attached to the sock lining, and a wedge heel, if used, is secured to the rear portion of the platform sole. The platform cover is then turned and secured or "lasted" to the bottom faces of the platform sole and wedge heel, after which the shoe is ready to receive an outsole. The outsoles in cement shoes of this type are usually attached by a quick setting or "instant pressure" cement, which does not need to be activated but which sticks permanently upon the application of pressure alone, thereby permitting the outsoles to be prespotted on the shoe bottoms a considerable time in advance of the sole attaching operation. Such shoes, with their soles temporarily attached or prespotted on the shoe bottoms, can be operated upon by the machine by pairs, that is, both shoes of each pair can be introduced into the machine to have their outsoles attached simultaneously and, after the sole attaching operation has been performed, the next pair of shoes can be presented to the shoe-receiving stations of both units of the machine, after which the shoes which have just been operated upon or "processed" by the machine can be removed from the shoe delivery or unloading stations, which removal, as will hereinafter appear, will initiate the operation of both units of the machine to start a new cycle of operation upon the pair of shoes just introduced into the shoe-receiving stations. The same thing occurs, of course, whether the operation being performed is cement sole attaching, sole laying, bottom ironing or some other bottom pressing operation.

Cements which may conveniently be used with prespotted outsoles in this type of work are pressure-responsive or "instant pressure" cements such as synthetic rubber cements. Although when attaching soles to shoes, the machine is especially adapted for operating upon shoes having prespotted soles to be attached by pressure-responsive cement, the machine is also adapted to attach outsoles to shoes in which the soles have not been prespotted on the shoe bottoms, for example, shoes in which the sole attaching cement requires activation by heat or a solvent and also requires the attachment of the outsoles to the shoe bottoms soon after such activation. In such cases, it may be preferable to operate upon one shoe at a time as soon as the cement has been activated and, accordingly, the machine is so constructed and arranged that it permits the operation of either station or unit, if desired, independently of the other station or unit.

As indicated above, the shoe receptacle 38 is moved rearwardly out of the shoe-receiving station to move the shoe S' (Figs. 1 and 3) from said station into an operating or work station, indicated generally in Figs. 2 and 8 by the numeral 71, the receptacle then moving the shoe forwardly again away from the operating station and returning it to the shoe-receiving station where the shoe is automatically transferred, in a manner later to be described, to the shoe delivery or unloading station. The means for moving the receptacle and shoe away from the shoe-receiving station into the operating station comprises a horizontal rack 72 (Figs. 2 and 3) arranged to be reciprocated rearwardly and forwardly of the machine by power-operated mechanism located in the base 20 and operated continuously from any usual source of power, such as a motor, through a belt 74. The belt drives a pulley 76 keyed to the end 78 of a crank 80 (Fig. 1) rotatably mounted in the frame 20 and rotated continuously in a clockwise direction, as viewed in Fig. 2, by the pulley. The crank 80 is provided at its central portion with parallel crank arms 84 interconnected by a pin 86 upon which is rotatably mounted an upstanding link 88 pivotally connected at its upper end by a pin 90 to an upwardly extending rack 92 provided with rack teeth 93. The rack 92 passes upwardly through vertical bearings in the rear portion of the machine provided by mechanisms associated with the pressure applying mechanism as will be hereinafter explained.

The frame 20 is provided at opposite sides with bosses 94 (Figs. 1, 2 and 5) in which are secured by taper pins a pair of vertical standards or posts 96 which have a horizontal casting 98 pinned to their lower portions which provides part of the bearing for the rack 92. The casting 98 is provided with a pair of cylindrical housings 100 (Figs. 2 and 5) which are tapped or threaded internally to receive cup-shaped cylinders 102 which support heavy compression springs 104, this mechanism forming part of the operating station 71 referred to above, as will be more fully explained hereinafter. Above the casting 98 is another horizontal casting 106 which is slidably mounted on the posts 96 and carries right and left pad boxes 108 and 110 provided with yieldable pads arranged to apply pressure to the bottoms of right and left shoes mounted respectively thereon.

Between the pad boxes 108, 110 the casting 106 is provided with an upstanding arm 112 having forwardly projecting ears 114 (Figs. 2 and 5) in which a pin 116 is rotatably mounted. Secured to the pin 116 is a pinion 118 and spur gears 120 and 122 integral with the pinion which rotate with the pin 116. The pinion 118 meshes with the teeth 93 of the vertical rack 92, the gears 120 and 122, as illustrated in Figs. 2 and 5, meshing respectively with the horizontal racks 72 provided at the right- and left-hand stations of the machine. Accordingly, downward movement of the vertical rack 92 by the crank 84, rotates the pinion 116 and gears 120, 122 in a counterclockwise direction, as viewed in Fig. 2, to move the horizontal racks 72 of both stations simultaneously toward the rear of the machine. The racks 72 are reciprocated continuously rearwardly and forwardly of the machine predetermined distances determined by the throw of the crank 84.

The shoe receptacles 38 are arranged to be connected to the horizontal racks 72 and moved out of the shoe-receiving station into the operating station. After a short dwell at that station, during which pressure is applied to the shoes to attach the soles thereto, the receptacles are moved automatically away from the operating station back again into the shoe-receiving station. The processed shoes are then transferred automatically from the receiving stations into the shoe delivery or unloading stations where they are subsequently removed manually by the operator, this manual removal of the shoes from said unloading stations operating automatically, in a manner to be explained, to connect the shoe receptacles 38 at the receiving stations to the racks 72 and thus to initiate another cycle of operation of the machine, the shoe receptacles at the receiving stations having in the meantime had another pair of shoes placed therein.

Before describing the means for connecting the shoe receptacles 38 to the racks 72 by the manual removal of the processed shoes from the unloading stations, it will be desirable to describe the pressure-applying mechanism at the operating stations 71. As illustrated in Figs. 2 and 5, the pad boxes 108, 110 at these stations are secured by screws to the horizontal casting 106 which is slidably mounted on the vertical posts 96 and is normally held upwardly against lock nuts 124 threaded onto the posts by the heavy compression springs 104 in the cylinders 102, the springs entering recesses in the casting 106 and the nuts 124 determining the upper positions of the pad boxes. The pad boxes are provided with yieldable pads 126, of rubber or other resilient material, and the upper surfaces of the pads, as illustrated in Figs. 8 and 9, are shaped to conform substantially to the longitudinal contour of the bottom of a shoe having an arched or "scooped" shank portion. In other words, the intermediate portions of the upper surfaces of the pads 126 are bulged or elevated somewhat, as indicated at 128 (Fig. 9), to conform more closely to the curvatures at the shank portions of shoes having arched shanks.

In order to permit the receptacles 38 to move the shoes over the pads when the receptacles are reciprocated rearwardly by the racks 72, the pad boxes 108, 110 are provided on their opposite sides with tracks 130 which, as illustrated in Fig. 3, register at their forward ends with the tracks 36 on the bracket 22. Accordingly, the two sets of rolls 42 and 44 on the receptacles 38 will travel from the tracks 36 onto the tracks 130 on the pad boxes 108 and 110. As shown in Figs. 8 and 9, the tracks 130 are provided near their rearward ends with raised portions 132 which, at the rearward ends of the pad boxes, drop again to the normal level of the tracks 36. The purpose of the elevations 132 is to cause the receptacles 38 to be tipped upwardly as they pass onto the high portions 132 of the tracks and thereby lift the toe ends of the shoes away from the pads to permit the shoes to pass over the bulged portions 128 of the pads, the rearward rolls 42 passing off the high portions 132 down to the normal level of the tracks, thereby returning the receptacles into a substantially horizontal position. Each shoe will be located in a predetermined position longitudinally of the pad, this latter position, as stated, being controlled by the lengthwise movement of the rack 72 and also by the fact that the shoe S' was initially positioned lengthwise in the receptacle 38 by means of the spring clips 40 and the line 70 on the rearward pivoted plate 66. It will be understood, of course, that the pivoted plates 54, 56 and 66 do not travel with the receptacle 38 because these plates are mounted on the flanges 34 on the bracket 22.

The posts 96 have reduced upper portions 134 (Fig. 5) to the upper ends of which is secured by clamping screws 136 a crosshead 138 provided with a central boss 140 which forms an upper bearing for the vertical rack 92. Below the crosshead 138 the rack 92 has pivoted thereon by a pin 142 a horizontal carrier member 144 which straddles the rack and is arranged for swinging movement about the pivot 142, this movement being limited by a pin 146 mounted in the rack and entering a short transverse slot 148 in the carrier. The opposite ends of the carrier 144 support pins 150 to which are pivoted a pair of couplings 152 arranged for limited swinging movement transversely of the machine and carrying horizontal pins 154. Pivotally mounted on the horizontal pins 154 are presser feet 156 which, as illustrated in Fig. 2, comprise V-shaped members having forwardly extending arms with flat surfaces 158 thereon for engaging the tops of the heel portions of the lasts in the shoes being operated upon, for example, the platform shoes S mounted on the lasts L illustrated in Figs. 1, 8 and 9, these shoes having outsoles O prespotted on their bottom surfaces. The presser feet also have rearwardly and downwardly extending arms 160 provided at their lower ends with pads 162 of soft resilient material, such as rubber or leather, for engaging the upper surfaces of the foreparts of the shoes S. It will be seen from the foregoing that, since the presser feet 156 are arranged for swinging movement both lengthwise and widthwise of the machine, they can adjust themselves automatically to the angles of the surfaces of the last and shoe which they engage, this self-adjustment being facilitated by the transverse swinging movement of the carrier 144. The presser feet 156 are constructed and arranged to operate simultaneously upon the shoes in both pad boxes. They will, however, operate separately on one shoe at a time in either pad box because the pin 146 (Fig. 5) in the slot 148 will contact the end of the slot and thus form an upward pressure support.

In the operation of the mechanism thus far described, the crank 84 moves the vertical rack 92 downwardly to lower the presser feet 156 toward the pads 126 in the pad boxes 108, 110. At the same time, the pinion 118 and gears 120, 122 move the horizontal racks 72 rearwardly at a considerably faster speed than the rack 92 moves downwardly owing to the greater size of the gears 120, 122 relatively to the pinion 118. The shoe receptacle 38 at each shoe-receiving station, after being connected to its rack 72, is moved by the rack along the tracks 36 and 130 over its corresponding pad, each receptacle tipping upwardly and then downwardly again into a horizontal position as the rolls 42 ride over the elevated portion 132 on the track 130. The rearward movement of the rack 72 is such that each receptacle will position its shoe in a proper lengthwise position over the pad 126 or so that the arched or "scooped" shank portion of the shoe will be located over the elevated portion 128 of the pad, as illustrated in Fig. 9. The longitudinal position of the shoe relatively to the pad is also controlled by the initial positioning of the shoe in the receptacle 38 in registration with the line 70 on the rearward plate 66. The receptacle 38 holds the shoe and sole relatively close to the upper surface of the pad so that very little downward movement of the shoe will bring the sole into engagement with said upper surface. Consequently, the spring clips 40 will remain in operative engagement with the shoe after the pressure applying operation has taken place.

As soon as the shoe S in each receptacle 38 has come to rest over the pad 126, the presser foot 156 over that shoe moves into engagement with the top of the last L and the forepart of the shoe and presses the shoe and sole forcibly against the pad with sufficient pressure to effect the sole attaching operation which, with the sole prespotted with pressure-responsive cement, requires only a fraction of a second to accomplish.

If the operation being performed is a sole pressing or a sole leveling operation instead of a sole attaching operation, the action of the machine is substantially the same, that is, the presser feet 156 engage the lasts and shoes and press them forcibly against the resilient pads 126 for a period of time sufficient to accomplish the operation being performed, the pad boxes 108, 110, yielding as much as may be necessary through compression of the springs 104 (Fig. 5) to permit the presser feet to move the full throw of the crank 84.

If the operation being performed is a bottom ironing operation, the pads 126 may be replaced by heated shoe bottom pressing or ironing devices of the type disclosed in United States Letters Patent No. 2,175,474 granted October 10, 1939, upon an application filed in the name of Axel A. Lawson. In such cases, the power drive of the machine should preferably be slowed down to 10 or 15 R. P. M. rather than 30 R. P. M., as in the case of cement sole attaching.

The mechanism is timed so that each presser foot 156 presses the shoe against the pad to attach the sole or press the shoe bottom during the short dwell referred to above, this dwell being caused by lost motion occurring in the reciprocation of the horizontal rack 72, as will be presently explained. After the pressure has been applied, the receptacle 38 is moved forwardly again by the rack 72 into the shoe-receiving station while the vertical rack 92 is moved upwardly into its elevated position, the reciprocating movements of the racks 72 and 92 being continuous and in timed relation to each other as long as the crank 84 is operating. Since the machine is adapted to operate upon a pair of shoes at the same time, the presser feet 156 will engage the shoes and press them against the pads 126 simultaneously. It should be pointed out, however, that the mechanism at each station of the machine can also operate independently in so far as connecting the shoe receptacles 38 to the racks 72 is concerned. In other words, while the horizontal racks 72 reciprocate in unison and in predetermined timed relation to the operation of the vertical rack 92 and presser feet 156, so that both shoes receive pressure simultaneously, the connecting of the receptacles 38 to the racks 72 takes place separately depending upon the operator although, once connected, the receptacles move in unison with the two racks 72. Accordingly, it is possible with the present machine to operate upon one shoe at a time if it is so desired.

The mechanisms for connecting the receptacles 38 to the reciprocating racks 72 will now be described, these mechanisms extending between the shoe-receiving stations and the shoe-delivery or unloading stations so that the removal of the processed shoes S from the delivery stations automatically connects the receptacles 38 to the racks 72 and thereby initiates the next cycle of operation of the machine upon another pair of shoes S' which, in accordance with the procedure followed in operating the present machine, will have been mounted in the empty receptacles 38 at the shoe-receiving stations prior to the removal of the processed shoes from the unloading stations.

The delivery or unloading stations of the machine, as illustrated in Figs. 1 and 2, are located directly below the shoe-receiving stations. A horizontal shaft 164, secured in the bracket 22 by set screws or pins 165 and extending widthwise of both stations of the machine, has levers 166 pivotally mounted thereon, one lever for each station, the lever 166 for the right-hand station, as illustrated in Figs. 2 and 4, extending forwardly and being pivotally connected at its forward end by a pin 168 to downwardly projecting ears 170 formed on a horizontal shoe support or plate 172 arranged for heightwise movement at the delivery station and adapted to receive a processed shoe as it is transferred automatically from the receptacle 38 at the receiving station into the delivery station in a manner to be described hereinafter. The support 172 is normally urged upwardly into an elevated position by a spring 174 extending between a laterally extending boss 176 on the support and the left-hand flange 34 on the bracket 22. The boss 176 carries a horizontal pin 178 to which is pivoted an upstanding rod 180 connected at its upper end by a pin 182 to a lever 184 fulcrumed on a stud screw 186 (Figs. 2, 3 and 4) threaded into the bracket 22.

The receptacle 38 has an elongated lever 190 pivotally secured to its left-hand side, as viewed from the front of the machine, by a shoulder screw 188 (Fig. 3), the lever 190 being provided at its rearward end with an upstanding hook 192 and a downwardly facing hook 194, as shown in Figs. 2 and 4. Adjacent to its pivot 188, the lever 190 has another downwardly facing hook 196, the downwardly facing hooks 194 and 196 being spaced a predetermined distance apart to provide the lost motion previously referred to in this mechanism, as will be more fully explained hereinafter. The lever 190 (Fig. 4) has a forwardly extending arm 198 provided with a roll 200. The rack 72 carries a pin 202 (Figs. 3 and 4) which projects laterally into the path of the downwardly facing hooks 194 and 196 on the lever 190 and, in the operation of the machine, is arranged alternately to engage these hooks and thereby to connect the receptacle to the rack 72 and thus reciprocate the receptacle 38 rearwardly and forwardly of the machine to move the receptacle and shoe into the operating station and, after a dwell provided by the pin 202 traveling between the hooks 194, 196, to move the receptacle forwardly again away from the operating station back into the shoe-receiving station. A rearward arm 204 on the lever 184 has a laterally projecting end portion 206 which, as illustrated in Figs. 2, 3 and 4, is in position to engage the upstanding hook 192 on the lever 190 and to raise or lower this lever relatively to the receptacle 38 when the receptacle is located in the shoe-receiving station, thereby raising or lowering the downwardly facing hook 194 out of, or into, the path of the pin 202 on the reciprocating horizontal rack 72.

Each shoe delivery or unloading station is provided with sensing mechanism for determining the presence of a processed shoe on the support 172, this mechanism cooperating with the mechanism described above in connecting the receptacle 38 to the rack 72 and thereby initiating a cycle of operation of the machine upon a new shoe mounted in the shoe-receiving station. As illustrated in Figs. 2 and 4, the sensing mechanism comprises a lever 208 pivotally mounted on a horizontal shaft 210 secured by set screws in the bracket 22 and extending transversely through both stations of the machine, mechanism corresponding to that now being described being provided in the left-hand station of the machine as well as in the right-hand station. The lever 208 has an upper arm provided with a roll 212 arranged to engage and press upon the forepart of a processed shoe, for example, the shoe S (Fig. 2), after the latter has been transferred from the receptacle 38 at the shoe-receiving station onto the support 172 at the shoe delivery station. The lower arm of the lever 208 has pivotally connected thereto by a pin 213 a link 214 which extends forwardly and has pivotally connected to its front end by a pin 216 another link 218, which extends downwardly and is keyed at its lower end to a pin 220 rotatably mounted in the base 20. A latch 222 is pivoted on the upper pin 216 beside the link 218 and a pawl or dog 224 is keyed to the lower pin 220 for rotation therewith. The upper latch 222 is operated manually and is for the purpose of holding the shoe support 172 downwardly in the lower or depressed position shown in Fig. 2 when the machine is not operating or when no shoe is resting on the support 172. When the machine is ready to be operated, the operator swings the latch 222 out of the dotted line position shown in Fig. 2 into the full line position, thereby releasing the support 172 and permitting the spring 174 to elevate it into the raised or operative position shown in full lines in Fig. 4, in which position the support is ready to receive a processed shoe.

The sensing lever 208 is movable about its fulcrum 210 from an operating position, as shown in Fig. 2, in which the roll 212 is engaging the forepart of a processed shoe on the support 172, into the lower position shown in full lines in Fig. 4, the broken line position of this lever in this latter figure being the same as that shown in Fig. 2, in which the support carries a shoe and is depressed into its lower position and locked therein by reason of the shoe resting on the support 172. The lever 166 has two notches formed in its upper edge, a forward notch 226 and a rear notch 228. When a processed shoe is resting on the support 172, as shown in Fig. 2, the lower end of the sensing lever 208 carrying the pin 213 is positioned between the notches 226, 228 and, because the roll 212 is bearing downwardly upon the forepart of the shoe, the lower end of the lever acts as a lock or stop to prevent the lever 166 from rising under the action of the spring 174 to elevate the shoe support. When the processed shoe is removed from the support 172, the upper arm of the lever 208 is permitted to drop, as shown in full lines in Fig. 4, to move the lower end of the lever 208 into the rearward notch 228, thereby unlocking the lever 166 and permitting the spring 174 to elevate it and the support 172 into their upper or shoe-receiving position, the support being provided at its rear portion with an opening 229 (Fig. 3) to permit the lever 208 to pass by the support without striking it.

The reciprocating frames or yoke members 26, 28 at the front of the two stations of the machine (Figs. 1 and 2) are provided respectively at their upper ends with shoe depressers 230, 232 which are preferably integral with the yokes and operate to transfer the processed shoes from the receptacles 38 at the shoe-receiving stations onto the supports 172 at the delivery stations after the shoes have been operated upon by the pressure applying mechanisms and have been returned by the receptacles 38 and racks 72 into the shoe-receiving stations. Each depresser transfers the shoe from its receptacle 38 onto the elevated support 172 by forcing the shoe downwardly out of the spring clips 40 and through the open bottom of the receptacle, the pivoted plates 54, 56 and 66 above referred to acting to steady the shoe and preventing it from dropping by gravity as it passes downwardly onto the support. As illustrated in Figs. 1, 2 and 4, the ribs 30, 32 on the bottoms of the yoke members 26, 28, have latches 234 (Fig. 4) pivoted freely thereon upon pins 236, each of these latches comprising a lower hook 238, a forwardly extending finger 240 and an upper shoulder 242. When the mechanism is located in the position shown in Fig. 2, with a processed shoe on the support 172, the latch 234 is held in a rearwardly extending or inoperative position, as shown in Figs. 2 and 4, by the pawl 224 engaging the finger 240. The yoke 26 is maintained at this time in its upper or inoperative position by a spring-pressed plunger 244 mounted in the frame 20 and urged forwardly by a spring 246, the plunger entering a V-shaped notch 248 formed in the yoke 26 and thus determining its upper position.

At the time the processed shoe is being transferred or depressed onto the support 172, the pawl 224 is engaging the finger 240 of the latch 234, as illustrated in Figs. 2 and 4, so that the pawl holds the hook 238 in a rearwardly extending position. Removing the processed shoe from the support 172 and permitting the latter to rise into the full line position shown in Fig. 4, moves the pawl 224 further inwardly over the finger 240 through the movement of the lever 208 so that the latch is still maintained in an inoperative position at the time the support is elevated to receive the processed shoe.

Integral with the hub of the lever 208 is an arm 250 pivotally connected by a pin 252 to an upstanding link 254 which, in turn, is pivotally connected at its upper end by a pin 256 to a lever 258 rotatably mounted on a stud 260 fastened in the bracket 22, the lever 258 having a forward arm 262 which projects upwardly adjacent to the right-hand side of the receptacle 38 (Figs. 1 and 3). A spring 264 (Figs. 2 and 4) extending between the link 254 and the flange 34 on the bracket 22, tends normally to urge the link 254 and arm 250 upwardly and thereby to rotate the lever 208 in a counterclockwise direction, as viewed in Figs. 2 and 4. When the processed shoe is removed from the support 172, the spring 264 moves the forward arm 262 of the lever 258 into the inclined position shown in full lines in Fig. 4. The spring 264 also constitutes the means which holds the roll 212 against the forepart of the shoe on the support 172 and causes the lever 208 to move downwardly in a counterclockwise direction when the shoe is removed from the support. A downwardly projecting finger 266 (Figs. 3 and 4), riveted to an inner boss on the right-hand side wall of the receptacle 38, is arranged to strike the arm 262 as the receptacle moves rearwardly and to swing the arm 262 clockwise, as viewed in Fig. 4, into the position shown in Figs. 6 and 10, this action, through the link 254 and arm 250, rotating the lever 208 and roll 212 out of the path of the shoe which, after it has been operated upon as illustrated in Fig. 6, is to be depressed by the depresser 230 onto the support 172. The arm 262, after it has been swung to the right by the finger 266, moves the lever 208 from the rearward notch 228 in the lever 166 into the forward notch 226. The receptacle 38 has now moved into the operating or work station of the machine and the shoe therein is being pressed forcibly against the pad 126 by the presser foot 156, the connecting of the receptacle to the rack 72 having taken place automatically by removal of the processed shoe from the support, as will be presently explained.

The movement of the arm 262 by the receptacle 38 as just described also moves the link 214 forwardly and swings the link 218 forwardly about the lower pivot 220, as indicated in Fig. 6, thereby freeing the pawl 224 from the latch 234 and permitting the latch to drop by gravity to locate the hook 238 in a downwardly extending or vertical position determined by a stop pin 268 mounted in the rib 30 of the yoke 26. The latch 234 is now in a position to cause operation of the yoke 26 and depresser 230.

The mechanism for operating the shoe depressers 230, 232, in predetermined timed relation to the reciprocation of the receptacles 38 and to the operation of the presser feet 156 in both stations of the machine, comprises a pair of crank arms 270, 272 (Fig. 1) located at opposite sides of the machine on the crank 80. Each of the crank arms 270, 272 is pivotally connected by a pin 274 (Fig. 2) to a forwardly extending link 276 which, in turn, is connected at its forward end by a pin 277 to a rack 278 mounted for forward and rearward sliding movement in a horizontal guideway 280 formed in the base 20, the inner side of the guideway being closed by a plate 282 (Fig. 1). Rotatably mounted above the rack 278 on a stud screw 284 is a gear 286 and, integral with this gear, is a larger gear 288. The gear 286 meshes with the teeth on the rack 278 so that reciprocation of the rack rearwardly and forwardly by the crank 270 rotates the gears alternately counterclockwise and clockwise, as illustrated in Figs. 6, 7, 10 and 11.

The large gear 288 meshes with a vertical rack 290 mounted for heightwise reciprocation in a guideway 292 provided in the frame 20, the upper end of the rack 290 having a pin 294 projecting laterally therefrom, as shown in Figs. 1, 2 and 6. When the machine is in its initial or starting position, as illustrated in Figs. 1 and 2, the crank 270 first reciprocates the horizontal rack 278 rearwardly to lower the vertical rack 290 into the position illustrated in Fig. 7 where the vertical rack is in its lowest position. Continued movement of the crank reciprocates the rack 278 in the opposite direction to raise the vertical rack 290, as illustrated in Fig. 6, the pressure-applying mechanism actuated by the crank 84 at this time operating upon the shoe, and the latch 234 on the yoke 26, having been released by the pawl 224 and having dropped downwardly into the vertical position shown in Fig. 6. Further movement of the crank 270 into the position illustrated in Fig. 11 raises the vertical rack 290 into its elevated position in which the hook 238 on the latch 234 hooks under the pin 294 and thus connects the yoke 26 to the vertical rack 290. Continued rotation of the crank 270 reciprocates the horizontal rack 278 rearwardly and moves the vertical rack downwardly again to carry the yoke 26 downwardly and thus move the depresser 230 toward the shoe-receiving station, as illustrated in Fig. 10, the spring-pressed plunger 244 in the frame slipping out of the notch 248 in the yoke 26 during the downward movement of the latter. The shoe will now have received pressure from the presser foot 156 and the receptacle 38 will have been moved forwardly by the horizontal rack 72 into the shoe-receiving station. Accordingly, when the yoke 26 descends the shoe depresser 230 thereon which, as illustrated in Figs. 2, 10 and 12, comprises a V-shaped member integral with the yoke 26 and having a horizontal forward surface 296 for engaging the heel portion of the last in the shoe, and a rearwardly projecting arm 298 provided with a pad for engaging the forepart of the last, moves downwardly, as illustrated in Fig. 10, into engagement with the processed shoe which is still held by the spring clips 40 in the receptacle 38. Continued movement of the yoke causes the depresser 230 to engage the shoe and to force it downwardly from between the spring clips 40 toward the shoe support 172 which, at this time, has been elevated into its higher position, as shown in Fig. 10, ready to receive the shoe. While the shoe is being forced downwardly through the open bottom of the receptacle 38 by the depresser 230, the pivoted plates 54, 56 and 66 are depressed to permit passage of the shoe, these plates, as stated acting to support and steady the shoe and prevent it from dropping by gravity onto the support 172. The plates 54, 56 and 66 have control of the shoe until it is in substantial engagement with the shoe support 172. The sensing lever 208 has previously been swung upwardly about its pivot 210, as illustrated in Fig. 10, to permit passage of the shoe without striking the lever, the lower end of this lever having been moved from the rearward notch 228 in the lever 166 into the forward notch 226 by the finger 266 on the receptacle 38 striking the upper arm 262 of the lever 258 when the receptacle was reciprocated rearwardly to move the shoe into the operating station.

The shoe depresser 230 continues downwardly for the full stroke of the crank 270, as illustrated in Fig. 12, thereby depressing the support 172 with the shoe thereon into its lower position and releasing the lower end of the lever 208 from the forward notch 226 to permit the lever to be swung counterclockwise by the spring 264 and thereby move the roll 212 into engagement with the forepart of the processed shoe on the support, as illustrated in Fig. 12, the lower end of the lever 208 now engaging the upper edge of the lever 166 adjacent to the rearward notch 228 and thus locking the mechanism in a depressed position as long as the processed shoe remains on the support. Movement of the sensing lever 208 into engagement with the shoe returns the mechanism which controls the position of the arm 262, that is, the arm 250 and link 254, into its initial position so that the arm 262 is again located in position to be engaged by the finger 266 on the receptacle 38 upon the next rearward movement of the receptacle.

The depresser 230 next moves upwardly away from the processed shoe to the upper extremity of its vertical reciprocation, this movement causing the finger 240 (Fig. 4) on the latch 234 to come into engagement with the pawl 224 which is now in a position to engage the finger and thus disconnect the latch from the vertical rack 290 so that, upon the next downward movement of the rack, it will not move the yoke 26 downwardly therewith, the latter having been again latched in its upper position by the plunger 244 in the frame 20. The machine is now ready to receive another shoe at the shoe-receiving station, after which the processed shoe on the shoe support 172 will be removed therefrom in order to initiate the operation of another cycle of this station of the machine.

As indicated above, the operator preferably positions a pair of shoes in the two shoe-receiving stations of the machine and then removes the two processed shoes from the supports 172 at the two delivery or unloading stations, as illustrated in Fig. 1, thereby initiating the operation of both stations of the machine at substantially the same time so that both stations will operate together on the new pair of shoes. The power-operated mechanisms of the machine operate simultaneously at both stations and the timing is such that both shoes will be operated upon simultaneously even though the operator does not remove both processed shoes from the delivery station at exactly the same time. However, as stated above, the operator could, if he so desired, lock one of the stations in an inoperative position by fastening the shoe support 172 downwardly by the hand latch 222 and he could then operate the other station separately to apply pressure to one shoe at a time or, if he so desired, he could operate one station continuously upon a plurality or run of either right or left shoes.

It is necessary to lift the lever 190 in order to remove the hook 194 from the path of the pin 202 on the reciprocating rack 72 when the receptacle 38 has been returned by the rack into the shoe-receiving station after the shoe has been operated upon at the operating station. As indicated above, when the rack 72 starts forwardly from the operating station, the pin 202 leaves the rear hook 194 on the lever 190 and travels forwardly until it engages the forward hook 196, this lost motion providing the dwell of the receptacle at the operating station during which pressure is applied to the shoe. As herein illustrated, this dwell is approximately $\frac{1}{7}$ of the time it takes to complete the reciprocation of the rack 72 in one direction, or $\frac{1}{14}$ of a complete cycle of the machine, although it could be varied in accordance with the kind of cement used by changing the distance between the lower hooks 194, 196 on the lever 190, or by changing the speed at which the machine operates. The speed of the machine may be varied as conditions warrant but on the usual classes of sole attaching work it is preferably relatively slow, for example, about 30 R. P. M.

The rack 72 moves the receptacle 38 forwardly away from the operating station back again into the shoe-receiving station while the lever 190 is in a horizontal position. Unless this lever is raised, therefore, to move the rear hook 194 out of the path of the pin 202 on the rack, the latter would move the receptacle out of the receiving station as the rack moved rearwardly again. To allow the receptacle to remain at the shoe-receiving station regardless of the continued reciprocation of the rack 72, there is provided on the yoke 26, adjacent to its left-hand side as viewed in Fig. 1, a downwardly extending, rigid arm 300, the lower end of which is rounded upwardly at its forward edge, as illustrated in Figs. 2 and 4, to form a cam surface which is arranged, upon downward movement of the yoke 26, to engage the roll 200 on the arm 198 of the lever 190 and to depress this arm, thereby elevating the rear arm of the lever and moving the lower hook 194 out of the path of the pin 202, the arm 300 holding the hook 194 in an elevated position until such time as the depression of the processed shoe on the support 172 at the delivery station depresses the support into its lower position and causes the rear arm 204 of the lever 184 on the bracket 22 to be elevated to engage the hook 192 by its end portion 206 and thus maintain the hook in an elevated position. The rigid arm or cam 300, therefore, lifts the hook 194 and permits rearward reciprocation of the horizontal rack 72 without moving the receptacle 38 out of the shoe-receiving station at a time when the lever 184 is inoperative to perform this function, that is, when the support 172 is elevated to receive a processed shoe from the shoe-receiving station but before the shoe has been transferred to the support 172 and the support depressed to elevate the rearward arm 204 of the lever 184.

Although the operation of the machine has already been partially described, a brief summary of a complete cycle of its operation will be given here in order that a clear understanding of the invention may be obtained. The machine is in its idle position as illustrated in Figs. 1, 2 and 3, with a pair of processed shoes S standing in the shoe delivery or unloading stations on the supports 172 so that the supports are depressed, as shown in these figures. The power-operated mechanisms of the machine, that is, the pulley 76, the cranks 84 and 270, and the reciprocating racks actuated by these cranks, are operating continuously by reason of the continuous rotation of the pulley by the motor or other source of power. If the machine is being started for the first time in a day's work, no processed shoes will be resting on the supports 172 at the delivery station but, in such case, the hand latches 222 will have been hooked over the supports, as indicated in broken lines in Fig. 2, so that the supports will nevertheless be located in their lower positions when the machine is started.

The operator selects a new pair of shoes S' with their outsoles temporarily spotted on the shoe bottoms, as explained above, and he places these shoes in their proper receiving stations between the spring clips 40 in the receptacles 38, locating the shoes heightwise by means of the pivoted plates 54, 56 and 66 and lengthwise by the line 70 on the rearward plate 66. He then removes the two processed shoes S from the supports 172, removing the shoes together or as nearly together as possible. If he is starting the machine for the first time that day and no processed shoes are resting on the supports, he merely releases the latches 222 simultaneously. Removal of the processed shoes S from the supports at the delivery station, or release of the latches 222, initiates the operation of both stations of the machine to start a new cycle of operation, the operating mechanisms thus tripped operating thereafter in unison at both stations.

Referring to the right-hand station only, removal of the processed shoe S (or latch 222) from the support 172 permits the sensing lever 208 to swing downwardly or counterclockwise, as viewed in Figs. 2 and 4, to release the lever 166 and permit it and the support to rise under the action of the spring 174, thereby lowering the rearward arm of the lever 184 on the bracket 22 and permitting the lever 190 on the receptacle 38 to drop to locate the rear hook 194 in position to engage the pin 202 in the rack 72 when the latter is moved rearwardly by the crank 84. After a short interval the receptacle 38 is moved rearwardly by the rack 72 into the operating station 71 where the rack comes to rest and, after a short dwell, starts to move forwardly again toward the shoe-receiving station, the pin 202 traveling from the rear hook 194 to the forward hook 196 and thus providing the dwell for the receptacle and shoe at the operating station. When the receptacle moved rearwardly toward the operating station, the finger 266 on the receptacle struck the arm 262 (Fig. 4) and, through the link 254 and arm 250, swung the sensing lever 208 and roll 212 into the position shown in Fig. 6, thereby moving this lever out of the path of the processed shoe which is later to be depressed onto the support 172.

While this is taking place, the presser foot 156 at the operating station is being moved downwardly by the crank 84 so that, when the shoe S (Fig. 6) is located over the yieldable pad 126 in position to be operated upon, the presser foot engages the last L and the forepart of the shoe S and presses them forcibly against the pad for the period of the dwell, that is, a second or a fraction thereof, thereby cement-attaching the sole to the shoe bottom by the pressure-sensitive cement between the sole and shoe bottom. The presser foot 156 starts rising immediately and the horizontal rack 72 begins to move the receptacle 38 and shoe forwardly again toward the shoe-receiving station, the pin 202 in the rack bar now engaging the forward hook 196.

When the shoe reaches the shoe-receiving station, as shown in Fig. 10, the rack 72 starts rearwardly again but there is another short dwell of the receptacle as the pin 202 on the rack travels from the forward hook 196 to the rearward hook 194. During this dwell, the shoe depresser 230 on the yoke 26 moves downwardly under the action of the crank 270, horizontal rack 278, the gears 286, 288, the vertical rack 290, and the latch 234, the latter having already connected the yoke 26 to the rack 290, so that the depresser 230 engages the processed shoe S at the receiving station almost immediately after it arrives therein and depresses it downwardly through, and out of, the receptacle 38 and onto the elevated support 172. The sensing lever 208, as stated above, has been previously moved out of the path of the shoe by the rearward movement of the rack 72 when the latter was moving the shoe into the operating station, this movement also disconnecting the pawl 224 from the latch 234 to permit the rack 290 to become connected to the yoke 26. As the yoke 26 descends the arm 300 thereon engages the roll 200 and lifts the lever 190 to move the lower hook 194 out of the path of the rack pin 202 so that the receptacle now remains in the receiving station irrespective of the continued reciprocation of the rack 72.

The depresser 230 forces the shoe downwardly onto the shoe support 172 and continues for a predetermined distance further to depress the support itself and thereby cause the lower end of the lever 208 to move out of the forward notch 226 in the lever 166 onto the portion of the lever adjacent to the rearward notch 228, thereby locking the mechanism to hold the support in its depressed position, as illustrated in Fig. 12. Depression of the support 172 swings the lever 184 on the bracket 22 counterclockwise to raise its rearward end 206 into engagement with the upper hook 192 and thus maintain the lever 190 in its elevated position after the yoke 26 has been raised by the rack 290, as shown in Fig. 11, thereby holding the hook 194 upwardly out of the path of the rack pin 202 and preventing further reciprocation of the receptacle 38 by the rack 72 until the lever 194 has been lowered again into the path of the pin 202 by the removal of another processed shoe from the support. The yoke 26 and depresser 239 will be raised by the crank into their uppermost positions and, during this movement, the pawl 224, which has been swung again into an inner or operative position, as shown in Figs. 2 and 12, by the movement of the lever 208 relatively to the horizontal lever 166, will engage the latch 234 and swing it rearwardly again, thereby automatically disconnecting the yoke 26 from the rack 290.

A full cycle of the machine having thus been completed, the cranks 84 and 270 will continue to reciprocate the racks 92, 72 and 290, as previously described, without causing any further operation of the machine until the processed shoe S (Fig. 2) at the delivery station at one side of the machine is removed from its support 172 to initiate a new cycle of operation of that station of the machine after a new shoe has been mounted in the receptacle 38, this being the procedure in the continuous operation of the machine. If the machine is to be stopped, however, the latch 222 is first hooked over the depressed support 172 and the processed shoe is then removed from the support, the latch holding the support depressed the same as if a processed shoe were resting thereon. In such case, of course, the machine will be started the first time, as stated above, by releasing the latch or latches 222. The operations described herein with reference to the right-hand station of the machine will take place simultaneously at the left-hand station so that a pair of shoes may have their outsoles cement attached or other pressing operations performed thereon during each complete cycle of the machine.

As pointed out above, the present machine is not only adapted for use in cement attaching soles to shoe bottoms with pressure-responsive cement or with cement which requires activation by heat or a solvent, but it is also adapted to perform other pressure applying operations upon the bottoms of shoes, for example, a bottom ironing operation or a sole laying or sole leveling operation. While the machine is arranged to perform a sole laying or leveling operation in its present form, that is to say, without any modification of the machine as disclosed herein, a bottom ironing operation requires a slight modification of the machine in that bottom pressing or ironing devices or units of the type mentioned above are substituted for the yieldable pads 126, these devices, as disclosed in the patent referred to, being heated in the usual manner for performing a bottom ironing operation. Preferably, the machine should be slowed down to 10 or 15 R. P. M. for a bottom ironing operation whereas a cement sole attaching, sole laying or sole leveling operation can best be performed at the normal speed of 30 R. P. M.

Having thus described my invention, what I claim as new and desire to secure by Letters Patent of the United States is:

1. A machine for operating upon shoes having, in combination, means for performing a pressing operation upon a shoe, and means controlled by the removal of a processed shoe from the machine for causing the pressing means to perform the pressing operation upon the first-named shoe.

2. A machine for operating upon shoes having, in combination, means for moving a shoe through the machine, means for automatically performing an operation upon the shoe during its movement through the machine, and means controlled by the removal of the processed shoe from the machine for initiating the operation of the shoe moving means upon the next shoe.

3. A machine for operating upon shoes having, in combination, means for operating upon a shoe, means for moving the shoe to and from said operating means, and means controlled by the removal of a finished shoe from the machine for initiating the operation of said operating and moving means upon another shoe.

4. A machine for operating upon shoes having, in combination, means for automatically performing an operation upon a shoe, means for moving the shoe to the operating means and for removing it therefrom after the operation has been performed, and means controlled by the removal of the processed shoe from the machine for initiating the operation of said operating and moving means upon the next shoe to be operated upon.

5. A machine for operating upon shoes having, in combination, a loading station, an operating station and an unloading station, means for moving a shoe from the loading station to the operating station and thence to the unloading station, and means controlled by the removal of a shoe from the unloading station for initiating the operation of the shoe moving means on a shoe at said loading station.

6. A machine for operating upon shoes having, in combination, an operating station and an unloading station, a shoe receptacle, means for moving said receptacle into and away from the operating station, and means controlled by the removal of a shoe from the unloading station for connecting the receptacle to the means for moving the same.

7. A machine for operating upon shoes having, in combination, a loading station, a work station and an unloading station, means for moving a shoe from the loading station into the work station and then away from said work station, back again into the loading station and means for moving the shoe from the loading station into said unloading station.

8. A machine for operating upon shoes having, in combination, a shoe-receiving station, an operating station and a shoe-delivery station, means for automatically moving a shoe from the shoe-receiving station into the operating station and, after a dwell thereat, for moving the shoe away from said operating station back into the shoe-receiving station, and means operating in predetermined timed relation to the shoe moving means for moving said shoe from the shoe-receiving station into the shoe delivery station.

9. A machine for operating upon shoes having, in combination, a loading station, a work station and an unloading station, a shoe receptacle at the loading station, means for moving the shoe receptacle from the loading station into the work station and then away from said work station back into the loading station, means for moving the shoe into the unloading station, and means at the unloading station controlled by the removal of the processed shoe therefrom for automatically initiating the next operating cycle of the machine.

10. A machine for operating upon shoes having, in combination, a loading station, an operating station and an unloading station, a shoe receptacle normally located at the loading station, means separate from the shoe receptacle for moving the receptacle from said loading station into the operating station and then away from said operating station back into the loading station, means for moving the shoe from the loading station into the unloading station, sensing means for determining the presence of the shoe at said unloading station, and means actuated automatically by the sensing means upon the removal of the shoe from said unloading station for coupling the shoe receptacle to the means for moving the same.

11. A machine for applying pressure to shoe bottoms having, in combination, a loading station, a work station and an unloading station, means for moving a shoe from the loading station into the work station and thence to the unloading station, means for applying pressure to the shoe while it is at the work station, and means controlled by the removal of the processed shoe from the unloading station for automatically initiating the operation of the shoe moving means upon the next shoe.

12. A machine for applying pressure to shoe bottoms having, in combination, a shoe-receiving station and a pressure-applying station, a shoe receptacle movable between the shoe-receiving station and the pressure-applying station, a support arranged to receive a shoe after it has been operated upon at said pressure-applying station, and means controlled by the removal of a processed shoe from said support for initiating movement of the shoe receptacle.

13. A machine for applying pressure to shoe bottoms having, in combination, a loading station and an operating station, pressure-applying means at the operating station, means for moving a shoe at the loading station into and away from said operating station in timed relation to the operation of said pressure-applying means, and means actuated automatically by the removal of a processed shoe from the machine for initiating the operation of the shoe moving means upon the shoe at said loading station.

14. A machine for applying pressure to shoe bottoms having, in combination, a loading station, an operating station and an unloading station, a shoe receptacle arranged to move a shoe from the loading station into the operating station and then away from said operating station after a short dwell thereat, pressure-applying means at the operating station arranged automatically to apply pressure to the shoe during said dwell, means for transferring the processed shoe from the receptacle to the unloading station, and means operative upon the removal of the shoe from the unloading station for automatically initiating movement of the shoe receptacle away from the loading station.

15. A machine for applying pressure to shoe bottoms having, in combination, a shoe-receiving station and an operating station, pressure-applying means at said operating station, means for moving a shoe automatically into the operating station and then away from said station, power-operated means for operating said pressure-applying means and shoe moving means in timed relation to each other, and means actuated automatically by the removal of a processed shoe from the machine for causing said power-operated means to operate said shoe moving means.

16. A machine for applying pressure to shoe bottoms having, in combination, a shoe-receiving station, an operating station and an unloading station, a shoe receptacle for moving a shoe from the shoe-receiving station into the operating station and then away from said operating station back into the shoe-receiving station, pressure-applying means at the operating station for applying pressure to the shoe bottom, means at the shoe-receiving station for transferring the processed shoe from the receptacle into the unloading station, power-operated means for operating the shoe receptacle, pressure-applying means and transferring means in predetermined timed relation to each other, and means controlled by the removal of the processed shoe from the unloading station for causing said power-operated means to operate said receptacle, pressure-applying means and transferring means in said predetermined timed relation.

17. A machine for applying pressure to shoe bottoms having, in combination, a yieldable pad for applying pressure to the bottom of a shoe, a constantly-operated member movable toward and away from the pad for pressing the shoe thereon, means for moving the shoe over the pad and then moving it away from the pad after pressure has been applied to the shoe, and means actuated automatically by the removal of the processed shoe from the machine for causing said shoe moving means to move a shoe in predetermined timed relation to the movement of the constantly-operated pressing member.

18. A machine for applying pressure to shoe bottoms having, in combination, a yieldable pad for applying pressure to the bottom of a shoe, a member for pressing the shoe against said pad, means movable toward and away from the pad for positioning the shoe thereon and for moving the shoe away from the pad after pressure has been applied thereto, power-operated means for operating said pressing member and movable means in predetermined timed relation to each other, and means controlled by the removal of a processed shoe from the machine for causing said power-operated means to operate said movable means.

19. A machine for applying pressure to shoe bottoms having, in combination, a shoe-receiving station, an operating station and a shoe-delivery station, means at the operating station for applying pressure to the bottom of a shoe, a shoe receptacle arranged to move the shoe from the shoe-receiving station into the operating station and then away from said operating station back again into the shoe-receiving station, said receptable operating in timed relation to the operation of the pressure-applying means, means for automatically transferring the processed shoe from the shoe-receiving station into the delivery station, power-operated means for operating said pressure-applying means, shoe receptacle and transferring means, and means at the delivery station for preventing said power-operated means from operating said shoe receptacle and transferring means until the processed shoe has been removed from said delivery station.

20. A machine for applying pressure to shoe bottoms having, in combination, a shoe-receiving station, an operating station and a delivery station, means at the operating station for applying pressure to a shoe, a shoe receptacle operable to move the shoe from the shoe-receiving station into the operating station and, after a short dwell thereat, to move the shoe away from said operating station back again into the shoe-receiving station, means for operating said shoe receptacle, a member at said operating station for pressing the shoe against the pressure-applying means during said dwell, thereby applying pressure to the bottom of the shoe, means at the shoe-receiving station for transferring the processed shoe automatically into the delivery station, and means at the delivery station for preventing further operation of the shoe receptacle by its operating means until the processed shoe is removed from said delivery station.

21. A machine for applying pressure to shoe bottoms having, in combination, a yieldable pad for applying pressure to the bottom of a shoe, a shoe receptacle for moving the shoe onto the pad and for moving the shoe away from said pad after pressure has been applied thereto, a rack for reciprocating said receptacle in substantially the plane of the pad, a presser foot for pressing the shoe against said pad, a rack for reciprocating the presser foot at right angles to the pad, a rotary crank, means for continuously rotating said crank, connections between said crank and said racks for reciprocating the racks in timed relation to each other, and means controlled by the removal of a processed shoe from the machine for connecting the shoe receptacle to its rack to initiate a cycle of operation of the machine.

22. A machine for applying pressure to shoe bottoms having, in combination, a yieldable pad for applying pressure to the bottom of a shoe, a shoe receptacle for moving the shoe onto the pad and then moving it away from said pad after pressure has been applied thereto, a continuously operating rack for reciprocating said receptacle in substantially the plane of the pad, a presser foot for pressing the shoe against said pad, a continuously operating rack for reciprocating the presser foot at right angles to the pad, a crank for operating said racks in predetermined timed relation to each other, said receptacle being normally disconnected from its rack, a hook pivoted on the receptacle for connecting said receptacle to its rack, means actuated automatically by the removal of a processed shoe from the machine for permitting said hook to connect the receptacle to its rack, thereby initiating an operating cycle of the machine, and means normally holding said hook away from said rack.

23. A machine for applying pressure to shoe bottoms having, in combination, a loading station, an operating station and an unloading station, pressure-applying means at the operating station, a presser foot at said operating station movable to press a shoe against said pressure-applying means, a receptacle normally located at the loading station and arranged to move a shoe over the pressure-applying means and then to move it away from said means into said loading station, power-operated means for reciprocating said presser foot and receptacle at right angles and in timed relation to each other, thereby effecting the pressure-applying operation, means for automatically transferring the shoe from said loading station into the unloading station after pressure has been applied thereto, sensing mechanism at said unloading station for determining the presence of a shoe thereat, and means controlled by said sensing mechanism upon the removal of the shoe from the unloading station for automatically initiating the movement of said receptacle thereby starting the next cycle of operation of the machine.

24. A machine for operating upon shoes having, in combination, a plurality of operating stations for performing an operation upon a plurality of shoes, means individual to each operating station for moving each shoe into said station and for moving the shoe away from said station after the operation has been performed thereon, and means controlled by the removal of any of the processed shoes from the machine for causing that station which operated upon the shoe which was removed to operate upon the next shoe presented to said station.

25. A machine for applying pressure to shoe bottoms having, in combination, a pair of pads for applying pressure simultaneously to a pair of shoes, presser feet for pressing the shoes against said pads, means for moving the shoes onto the pads and for removing them therefrom after pressure has been applied, and means controlled by the removal of either of the processed shoes from the machine for initiating the operation of the shoe moving means associated with the pad which processed such shoe upon another shoe.

26. A machine for applying pressure to shoe bottoms having, in combination, a plurality of yieldable pads for applying pressure to the bottoms of shoes placed thereon, means for automatically moving the shoes onto said pads and for moving the shoes away from said pads after a short dwell thereat, presser feet for pressing the shoes against the pads during said dwell, thereby completing the pressure-applying operation, power-operated means for actuating said shoe moving means and said presser feet, and means controlled by the removal of any of the processed shoes from the machine for initiating the operation of the shoe moving means associated with the pad or pads which applied pressure to such shoes.

27. A machine for applying pressure to shoe bottoms having, in combination, a yieldable pad for applying pressure to the bottom of a shoe, means movable in a rectilinear path toward and away from the pad in substantially the plane thereof for moving the shoe onto the pad and for moving the shoe away from said pad after a short dwell thereat, a presser foot movable substantially at right angles to the pad for pressing the shoe against said pad during said dwell, thereby accomplishing the pressure-applying operation, power-operated means for actuating said movable means and said presser foot in predetermined timed relation to each other, and means actuated automatically by the removal of a processed shoe from the machine for initiating the operation of said movable means.

28. A machine for applying pressure to shoe bottoms having, in combination, a pair of pads for applying pressure to the bottoms of shoes mounted thereon, a loading station and an unloading station associated with each pad, means for each pad arranged to move a shoe from the loading station to the pad and, after a short dwell thereat, to move the shoe away from said pad into the unloading station, means opposite each pad for pressing the shoe thereon during said dwell, and means controlled by the removal of either processed shoe from its unloading station for initiating the next operation of the shoe moving means associated with that unloading station.

29. A machine for operating upon shoes having, in combination, a shoe-receiving station, an operating station and a delivery station, means for moving a shoe from the receiving station into the operating station and, after an operation has been performed on the shoe, for moving the shoe away from said operating station into the delivery station, continuously operating means for actuating the shoe moving means, means at said delivery station actuated automatically by the removal of the processed shoe therefrom for initiating the next cycle of operation of the machine, said means including a support for the shoe, a sensing member engaging the shoe on said support, and connections between said support and said shoe moving means whereby, when the shoe is removed from the support, the latter connects the shoe moving means to said continuously operating means.

30. A machine for operating upon shoes having, in combination, means for operating upon a shoe, power-operated means for actuating said operating means, means controlled by the removal of a processed shoe from the machine for causing said operating means to operate upon the shoe, said controlled means comprising a movable support for a processed shoe, mechanism between said movable support and said operating means for connecting the operating means to said power-operated means, and means associated with said support for moving the latter when a processed shoe is removed therefrom and thereby causing the connecting mechanism to couple said operating means to said power-operated means.

31. A machine for operating upon shoes having, in combination, means for operating upon a shoe, power-operated means for actuating said operating means, means controlled by the removal of a processed shoe from the machine for causing the operation of the operating means upon the first named shoe, said controlled means comprising a support for a processed shoe movable relatively to said operating means, mechanism between said support and said operating means for connecting the operating means to said power-operated means, sensing means associated with said support for causing the latter to move when a processed shoe is removed therefrom, movement of the support causing the connecting mechanism to connect said operating means to said power-operated means and thus start the operation of said operating means upon said first-named shoe, and means for automatically disconnecting said operating means from said power-operated means after the operation upon said first-named shoe has been completed.

32. A machine for operating upon shoes having, in combination, means for performing an operation upon a shoe to process the same, means controlled by the removal of the processed shoe from the machine for initiating the operation of the machine upon the next shoe, said controlled means comprising a support for receiving the processed shoe, means for automatically moving the processed shoe onto said support after it has been operated upon, a sensing member for engaging the processed shoe and determining its presence on the support, and mechanism actuated by said sensing member upon the removal of the processed shoe from the support for initiating the operation of the machine upon the next shoe.

33. A machine for applying pressure to shoe bottoms having, in combination, means for applying pressure to the bottom of a shoe, means controlled by the removal of a processed shoe from the machine for causing the pressure-applying means to operate upon an unprocessed shoe, said controlled means comprising a movable support for receiving the processed shoe, means for automatically transferring the processed shoe from the pressure-applying means to said support, a sensing lever associated with the support for indicating the presence or absence of a processed shoe thereon, and mechanism between said support and said pressure-applying means for causing the latter to operate upon the unprocessed shoe when the sensing lever indicates the absence of a processed shoe on the support.

34. A machine for applying pressure to shoe bottoms having, in combination, a pair of pads for applying pressure to the bottoms of a pair of shoes mounted thereon, continuously operating means for pressing the shoes simultaneously against said pads, means individual to each pad for automatically moving the shoes onto the pads and for removing them therefrom after the pressure-applying operation has been completed, said last-named means operating in predetermined timed relation to the operation of the pressure-applying means, and means controlled by the removal of either of the processed shoes from the machine for causing the shoe moving means associated with that shoe to move another shoe independently of the other individual shoe moving means.

35. A machine for applying pressure to shoe bottoms having, in combination, a pad for applying pressure to the bottom of a shoe, a continuously operating presser foot for pressing the shoe against said pad, a receptacle for receiving the shoe and moving it onto the pad and for moving it away from the pad after pressure has been applied thereto, means for operating said receptacle in timed relation to the operation of said presser foot, said means comprising a rack arranged to reciprocate back and forth constantly in timed relation to the continuous operation of said presser foot, a roll on said rack, and a hook on said receptacle.

36. A machine for applying pressure to shoe bottoms having, in combination, a yieldable pad for applying pressure to the bottom of a shoe, a presser foot for pressing the shoe against said pad, a crank for operating said presser foot continuously, a receptacle for moving the shoe onto said pad and for moving it away from the pad after pressure has been applied thereto, and connections between said receptacle and said crank for causing the receptacle to move the shoe in predetermined timed relation to the operation of said presser foot, said connections being rendered operative by the removal of a processed shoe from the machine but being rendered inoperative automatically after the receptacle has moved the first named shoe away from the pad.

37. A machine for operating upon shoes having, in combination, a shoe-receiving station, an operating station and a shoe-delivering station, means for moving a shoe from the shoe-receiving station into the operating station and, after a short dwell thereat, for moving the shoe out of said operating station into the shoe-delivery station, the shoe being operated upon during said dwell, power-operated mechanism for actuating the shoe moving means, a hook for connecting said shoe moving means to said power-operated mechanism, and means for preventing said hook from connecting the shoe moving means to said power-operated mechanism while the processed shoe remains in the shoe-delivery station.

38. A machine for applying pressure to shoe bottoms having, in combination, a shoe-receiving station, a pressure-applying station and a shoe-delivery station, a receptacle for moving a shoe automatically from the shoe-receiving station into the pressure-applying station and, after a short dwell thereat during which pressure is applied to the shoe, for moving the shoe away from said pressure-applying station back again into the shoe-receiving station, power-operated mechanism for operating said receptacle, a hook for connecting said receptacle to said power-operated means, means for automatically transferring the processed shoe from the shoe-receiving station to the shoe-delivery station, and means carried by the transferring means for preventing said hook from connecting the receptacle to said power-operated means while said transferring means is transferring the processed shoe to the shoe-delivery station.

39. A machine for applying pressure to shoe bottoms having, in combination, a shoe-receiving station, an operating station and a shoe-delivery station, a shoe receptacle for moving a shoe from the shoe-receiving station into the operating station and, after a dwell thereat during which pressure is applied to the shoe, for moving the shoe away from said operating station back again into the shoe-receiving station, power-operated means for operating the shoe receptacle, means for connecting said receptacle to said power-operated means, mechanism for transferring the processed shoe automatically from the shoe-receiving station to the shoe-delivery station, sensing means at said delivery station for determining the presence of a processed shoe therein, means for preventing said connecting means from connecting the receptacle to said power-operated means while the transferring mechanism is moving the processed shoe into the shoe-delivery station, and additional means for preventing said connecting means from connecting the receptacle to the power-operated means as long as the processed shoe remains in said delivery station.

40. A machine for operating upon shoes having, in combination, an operating station, continuously operating means at said station for performing an operation upon a shoe, and means for automatically moving the shoe into said operating station from a point remote therefrom in predetermined timed relation to the operation of said continuously operating means, the action of the shoe moving means in moving the shoe being caused by the removal of a processed shoe from the machine.

41. A machine for operating upon shoes having, in combination, an operating station, means at said operating station for performing an operation upon a shoe, means controlled by the removal of a processed shoe from the machine for moving the shoe into the operating station from a point outside said station and, after the operation has been performed on the shoe, for moving said shoe away from said operating station, said last-named means comprising a receptacle for the shoe operating in predetermined timed relation to the operation of the means at the operating station for performing the operation upon said shoe, and means for operating said receptacle.

42. A machine for applying pressure to shoe bottoms having, in combination, a yieldable pad for applying pressure to the bottom of a shoe, a presser foot for pressing the shoe against said pad, a shoe receptacle for automatically moving the shoe onto said pad from a loading station located in front of the pad and, after the presser foot has operated upon the shoe, for moving said shoe away from said pad back again into said loading station, and power-operated means for operating said presser foot and receptacle in predetermined timed relation to each other.

43. A machine for applying pressure to shoe bottoms having, in combination, a yieldable pad for applying pressure to the bottom of a shoe, a presser foot for pressing the shoe against said pad, means for automatically moving the shoe onto said pad from a point in front of the pad and, after the presser foot has operated upon the shoe, for moving the shoe away from said pad into an unloading station, and power-operated means for operating the shoe moving means in predetermined timed relation to the operation of said presser foot, thereby processing the shoe and moving it automatically into said unloading station.

44. A machine for applying pressure to shoe bottoms having, in combination, a pad for applying pressure to the bottom of a shoe, said pad having a pressing surface with a high portion thereon shaped to conform substantially to the longitudinal contour of the shank portion of a shoe bottom, means for moving a shoe lengthwise onto the pad from a point remote from said pad, said means being constructed and arranged to move the shoe in a path lying substantially in the plane of the pressing surface of the pad, and means for raising and lowering the leading end of the shoe as it passes over the high portion of the pressing surface of the pad, thereby preventing the shoe from striking said high portion.

45. A machine for applying pressure to shoe bottoms having, in combination, a yieldable pad for applying pressure to the bottom of a shoe, said pad having a pressing surface thereon shaped in substantial conformity with the longitudinal contour of a shoe bottom, means for automatically moving a shoe toe end first onto said pressing surface from a point in front of the pad, said means being constructed and arranged to move the shoe in a rectilinear path located substantially in the plane of said pressing surface, and means for automatically raising and lowering the toe end of the shoe as it passes over that portion of said pressing surface which engages the shank portion of the shoe bottom.

46. A machine for applying pressure to shoe bottoms having, in combination, a yieldable pad for applying pressure to the bottom of a shoe, said pad having an operating surface thereon which is shaped in substantial conformity with the longitudinal contour of a shoe bottom, a shoe receptacle for holding the shoe and automatically moving it lengthwise onto said operating surface from a point in front of the pad, said receptacle being arranged to move the shoe in a horizontal path located substantially in the plane of said surface, means for automatically raising and lowering the leading end of the receptacle as it passes over that portion of the operating surface of the pad which is elevated to engage the shank portion of the shoe bottom, thereby preventing the shoe from striking said elevated portion, and means for pressing the shoe against said operating surface without releasing the shoe from said receptacle.

47. A machine for applying pressure to shoe bottoms having, in combination, a pad for applying pressure to the bottom of a shoe, said pad having a pressing surface thereon, means arranged to move a shoe lengthwise onto the pad from a point outside said pad and, after pressure has been applied to the shoe, to move the processed shoe lengthwise away from said pad into a delivery station from which the processed shoe may be removed, said shoe moving means being arranged to travel in a rectilinear path located substantially in the plane of the pressing surface of the pad, and means for pressing the shoe against the pad without releasing the shoe from said shoe moving means, said pressing means operating in predetermined timed relation to the operation of said shoe moving means.

48. A machine for applying pressure to shoe bottoms having, in combination, a pad for applying pressure to the bottom of a shoe, a presser foot for pressing the shoe against said pad, means for moving the shoe automatically onto the pad from a point remote therefrom and, after pressure has been applied to the shoe, for moving the processed shoe away from said pad into a delivery station, a power-operated crank operating continuously, a rack actuated by said crank for operating said presser foot, a rack operated by said crank for moving the shoe moving means in predetermined timed relation to the operation of said presser foot, said last-named rack being normally disconnected from said shoe moving means, and a hook on said shoe moving means for connecting it to said last-named rack.

49. A machine for operating upon shoes having, in combination, a shoe-receiving station, an operating station and a shoe-delivery station, means for moving a shoe automatically from the shoe-receiving station into the operating station and for moving the shoe away from said operating station back again into the shoe-receiving station, and means at said shoe-receiving station for thereafter transferring said shoe automatically to the shoe-delivery station.

50. A machine for operating upon shoes having, in combination, a loading station, a work station and an unloading station, means for moving a shoe automatically from the loading station into the work station and, after a short dwell thereat, for moving the shoe away from said work station back again into the loading station, means at said work station for operating upon the shoe during said dwell, a support at said unloading station arranged to receive the shoe after it has been operated upon, and means at said loading station operating in timed relation to the shoe moving means for transferring the processed shoe automatically onto said support.

51. A machine for operating upon shoes having, in combination, a shoe-receiving station, an operating station located behind the shoe-receiving station, and a shoe-delivery station located below said shoe-receiving station, a frame-like receptacle for holding a shoe and moving it automatically from the shoe-receiving station into the operating station and, after a short dwell thereat, for moving the shoe away from said operating station back again into the shoe-receiving station, means at the operating station for applying pressure to the shoe during said dwell, thereby processing the shoe, a support at the shoe-delivery station movable heightwise to receive the processed shoe, mechanism at the shoe-receiving station for depressing the processed shoe from said shoe-receiving station onto the support at the shoe-delivery station, said mechanism operating to force the shoe downwardly through said receptacle onto said support, thereby depressing the support, and means at the shoe-delivery station for maintaining the support in its depressed position after the processed shoe has been deposited thereon.

52. A machine for applying pressure to the bottoms of shoes having, in combination, a shoe bottom pressing pad having a surface thereon arranged to receive a shoe and apply pressure to the bottom thereof to conform said bottom substantially in accordance with the shape of said surface, means for moving the shoe onto said pad and, after a dwell thereat, for moving the shoe away from the pad, means for pressing the shoe against said surface during said dwell, thereby conforming the shoe bottom to the shape of said surface, said means operating in predetermined timed relation to the operation of the shoe moving means, and means controlled by the removal of the processed shoe from the machine for causing said shoe moving means to move the next shoe onto said pad.

LLOYD G. MILLER.

REFERENCES CITED

The following references are of record in the file of this patent:

UNITED STATES PATENTS

| Number | Name | Date |
|---|---|---|
| 1,549,243 | Winkley | Aug. 11, 1925 |
| 2,178,990 | Exley | Nov. 7, 1939 |
| 2,451,978 | Richter | Oct. 19, 1948 |